(12) United States Patent
Ryu

(10) Patent No.: US 10,856,265 B2
(45) Date of Patent: Dec. 1, 2020

(54) METHOD FOR SELECTING RESOURCE OPERATION PREFERRED BY USER IN WIRELESS COMMUNICATION SYSTEM AND DEVICE FOR SAME

(71) Applicant: LG ELECTRONICS INC., Seoul (KR)

(72) Inventor: Jinsook Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 16/311,156

(22) PCT Filed: Jul. 5, 2017

(86) PCT No.: PCT/KR2017/007184
§ 371 (c)(1),
(2) Date: Dec. 18, 2018

(87) PCT Pub. No.: WO2018/008980
PCT Pub. Date: Jan. 11, 2018

(65) Prior Publication Data
US 2019/0364541 A1   Nov. 28, 2019

Related U.S. Application Data

(60) Provisional application No. 62/358,167, filed on Jul. 5, 2016.

(51) Int. Cl.
*H04W 72/02* (2009.01)
*H04W 76/25* (2018.01)
(Continued)

(52) U.S. Cl.
CPC ............. *H04W 72/02* (2013.01); *H04W 8/08* (2013.01); *H04W 24/10* (2013.01); *H04W 48/18* (2013.01);
(Continued)

(58) Field of Classification Search
CPC ..... H04W 24/10; H04W 48/18; H04W 72/02; H04W 76/25; H04W 76/28; H04W 80/10;
(Continued)

(56) References Cited

U.S. PATENT DOCUMENTS 8,098,658 B1    1/2012  Ranganathan et al.
2007/0198982 A1 8/2007  Bolan et al.
(Continued)

OTHER PUBLICATIONS

PCT International Application No. PCT/KR2014/007184, International Search Report dated Oct. 26, 2017, 3 pages.

*Primary Examiner* — Robert J Lopata
(74) *Attorney, Agent, or Firm* — Lee, Hong, Degerman, Kang & Waimey

(57) ABSTRACT

In one aspect of the present invention, there is provided a method for configuring, by a network node, a resource of a user equipment (UE) in a wireless communication system including receiving resource preference information of the UE; configuring a resource for the UE based on the resource preference information; and transmitting, to the UE, a result of configuring the resource for the UE, wherein the configuring of the resource for the UE based on the resource preference information includes, when a plurality of resource operation units in which an entire available resource range is divided into a predetermined number is configured for the UE, selecting a specific resource operation unit among the plurality of resource operation units according to the resource preference information of the UE.

6 Claims, 12 Drawing Sheets

(51) Int. Cl.
*H04W 76/28* (2018.01)
*H04W 8/08* (2009.01)
*H04W 24/10* (2009.01)
*H04W 48/18* (2009.01)
*H04W 80/10* (2009.01)

(52) U.S. Cl.
CPC .......... *H04W 76/25* (2018.02); *H04W 76/28* (2018.02); *H04W 80/10* (2013.01)

(58) Field of Classification Search
CPC ... H04W 8/08; H04W 72/04; H04W 72/0406; H04W 72/048
USPC ........................................................ 370/329
See application file for complete search history.

(56) References Cited

U.S. PATENT DOCUMENTS

| | | | |
|---|---|---|---|
| 2012/0230238 A1* | 9/2012 | Dalsgaard ............ | H04L 1/0026 370/311 |
| 2013/0100912 A1 | 4/2013 | Cai et al. | |
| 2013/0107727 A1* | 5/2013 | Lunden ............. | H04W 52/0216 370/252 |
| 2014/0038579 A1* | 2/2014 | Henttonen .............. | H04W 8/22 455/418 |
| 2014/0064069 A1 | 3/2014 | Liao | |
| 2015/0156719 A1* | 6/2015 | Quan ................ | H04W 52/0254 370/311 |
| 2015/0327321 A1* | 11/2015 | Dai ........................ | H04W 76/27 370/329 |
| 2016/0050671 A1 | 2/2016 | Yu et al. | |
| 2017/0026861 A1* | 1/2017 | Tseng ................... | H04B 17/318 |
| 2018/0070404 A1* | 3/2018 | Giguet .................. | H04W 24/02 |
| 2018/0269947 A1* | 9/2018 | Levitsky ................ | H04B 7/088 |
| 2018/0295664 A1* | 10/2018 | Tang .................... | H04W 48/18 |
| 2018/0338332 A1* | 11/2018 | Lee .................... | H04W 52/0241 |
| 2019/0110236 A1* | 4/2019 | Huang .................. | H04W 76/15 |
| 2019/0138934 A1* | 5/2019 | Prakash ................. | G06N 20/00 |
| 2019/0261448 A1* | 8/2019 | Hu ........................ | H04W 52/02 |
| 2019/0313340 A1* | 10/2019 | Lee ........................ | H04W 48/18 |

* cited by examiner (a) CONTROL PLANE PROTOCOL STACK (b) USER PLANE PROTOCOL STACK (a)

(b)

(a)

(b)

METHOD FOR SELECTING RESOURCE OPERATION PREFERRED BY USER IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2017/007184, filed on Jul. 5, 2017, which claims the benefit of U.S. Provisional Application No. 62/358,167, filed on Jul. 5, 2016, the contents of which are all hereby incorporated by reference herein in their entirety.

TECHNICAL FIELD

The present invention relates to a wireless communication system, and more particularly to a method for selecting a resource operation/usage scheme preferred by a user and a device supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present specification is to provide a method capable of indirectly selecting, by a user, a resource operation scheme of the user by allowing the user to inform a 5G/NextGen system of a resource operation/usage scheme preferred by the user according to a situation of the user since the 5G/NextGen system can configure various resources of a UE with satisfaction of various mobility levels and service continuity.

Technical problems to be solved by the present invention are not limited by the above-mentioned technical problems, and other technical problems which are not mentioned above can be clearly understood from the following description by those skilled in the art to which the present invention pertains.

Technical Solution

In one aspect of the present invention, there is provided a method for configuring, by a network node, a resource of a user equipment (UE) in a wireless communication system, the method comprising receiving resource preference information of the UE; configuring a resource for the UE based on the resource preference information; and transmitting, to the UE, a result of configuring the resource for the UE, wherein the configuring of the resource for the UE based on the resource preference information comprises, when a plurality of resource operation units in which an entire available resource range is divided into a predetermined number is configured for the UE, selecting a specific resource operation unit among the plurality of resource operation units according to the resource preference information of the UE.

The resource preference information may be network assistance information for indicating a resource operation scheme preferred by the UE, and may indicate a performance centric representing a preference for a resource operation that prioritizes a performance of the UE, or an energy centric representing a preference for a resource operation that prioritizes resource saving of the UE.

The network node may correspond to a mobility management (MM) for managing a mobility of the UE, a session management (SM) for managing a session of the UE, or an access node (AN) for serving the UE.

The configuring of the resource for the UE based on the resource preference information may comprise, when the resource preference information indicates the performance centric, selecting a discontinuous reception (DRX) cycle for the UE as a short cycle or a connection state to which the DRX cycle is not applied, and when the resource preference information indicates the energy centric, selecting the DRX cycle for the UE as a long cycle.

The configuring of the resource for the UE based on the resource preference information may comprise, when the resource preference information indicates the performance centric, not applying a power saving mode to the UE, and when the resource preference information indicates the energy centric, applying the power saving mode to the UE.

The configuring of the resource for the UE based on the resource preference information may comprise, when the resource preference information indicates the performance centric, selecting an always-on PDU session scheme that maintains the session for the UE regardless of whether the session is used by the UE, and when the resource preference information indicates the energy centric, selecting an on-demand PDU session scheme that releases the session when the session is not used by the UE for a predetermined time.

The configuring of the resource for the UE based on the resource preference information may comprise, when the resource preference information indicates the performance centric, selecting a quality of service (QoS) level of a service for the UE as a highest level, and when the resource preference information indicates the energy centric, selecting the QoS level as a level that satisfies a minimum requirement required to provide the service for the UE.

The configuring of the resource for the UE based on the resource preference information may comprise, when the resource preference information indicates the performance centric, selecting a channel quality indication (CQI) reporting period of the UE as a period shorter than a predetermined reporting period, and when the resource preference information indicates the energy centric, selecting the CQI reporting period as a period longer than the predetermined reporting period.

The configuring of the resource for the UE based on the resource preference information may comprise changing a slice for the UE to other slice based on the resource preference information.

The method may further comprise transmitting, to the UE, network slice selection assistance information (NSSAI) for the changed slice.

The changing of the slice for the UE to the other slice may comprise, when resource preference information about a resource operation scheme preferred by the network node is different from the resource preference information of the UE, changing a serving network node of the UE to other network node matched to the resource preference information of the UE.

The configuring of the resource for the UE based on the resource preference information may comprise configuring the resource for the UE in consideration of a slice and/or a service of the UE in addition to the resource preference information.

The resource preference information may be transmitted as a non-access stratum (NAS) message.

The method may further comprise, when a configuration parameter of the UE or other network node has to be changed according to the result of configuring the resources for the UE, transmitting a message requesting an update of the configuration parameter to the UE or at least one other network node.

In another aspect of the present invention, there is provided a network node for configuring a resource of a user equipment (UE) in a wireless communication system, the network node comprising a communication module configured to transmit and receive a signal; and a processor configured to control the communication module, wherein the processor is configured to receive resource preference information of the UE, configure a resource for the UE based on the resource preference information, and select a specific resource operation unit among a plurality of resource operation units according to the resource preference information of the UE when the plurality of resource operation units in which an entire available resource range is divided into a predetermined number is configured for the UE, and transmit, to the UE, a result of configuring the resources for the UE.

Advantageous Effects

According to embodiments of the present invention, since a network node receives, from a UE, information on a resource operation method preferred by a user/UE and selects resources, there is an effect of a reduction in the burden on the network node which has to select the most appropriate resources for providing services to the UE in a 5G/NextGen system that operates wide resources. Further, there is an effect that the operation of resources of the 5G/NextGen system optimized for UE's current situation and/or user's preference is possible.

Effects obtainable from the present invention are not limited by the above-mentioned effect, and other effects which are not mentioned above can be clearly understood from the following description by those skilled in the art to which the present invention pertains.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

MODE FOR INVENTION

Figure 1:
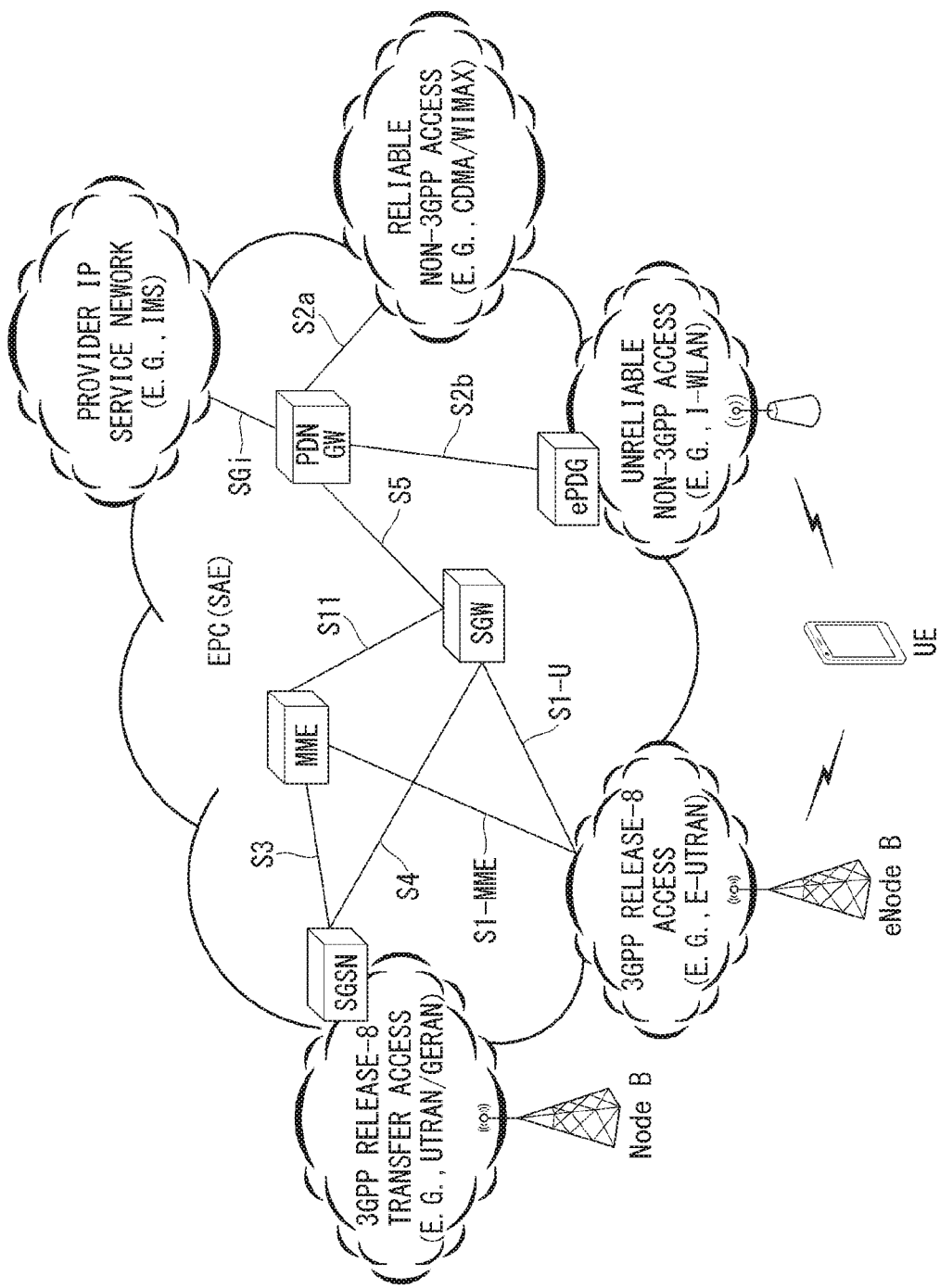
FIG. 1 is a diagram schematically exemplifying an evolved packet system (EPS) to which the present invention can be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.
  Universal Mobile Telecommunication System (UMTS): the 3rd generation mobile communication technology based on GSM, developed by the 3GPP
  Evolved Packet System (EPS): a network system comprising an Evolved Packet Core (EPC), a packet switched core network based on the Internet Protocol (IP) and an access network such as the LTE and UTRAN. The EPS is a network evolved from the UMTS.
  NodeB: the base station of the UMTS network. NodeB is installed outside and provides coverage of a macro cell.
  eNodeB: the base station of the EPS network. eNodeB is installed outside and provides coverage of a macro cell.
  User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.
  IP Multimedia Subsystem (IMS): a sub-system providing multimedia services based on the IP
  International Mobile Subscriber Identity (IMSI): a globally unique subscriber identifier assigned in a mobile communication network
  Machine Type Communication (MTC): communication performed by machines without human intervention. It may be called Machine-to-Machine (M2M) communication.
  MTC terminal (MTC UE or MTC device): a terminal (for example, a vending machine, meter, and so on) equipped with a communication function operating through a mobile communication network (For example, communicating with an MTC server via a PLMN) and performing an MTC function
  MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.
  (MTC) application: services (to which MTC is applied) (for example, remote metering, traffic movement tracking, weather observation sensors, and so on)
  (MTC) Application Server: a server on a network in which (MTC) applications are performed
  MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.
  MTC User (MTC User): The MTC user uses the service provided by the MTC server.
  MTC subscriber: an entity having a connection relationship with a network operator and providing services to one or more MTC terminals.
  MTC group: an MTC group shares at least one or more MTC features and denotes a group of MTC terminals belonging to MTC subscribers.
  Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.
  External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator)

provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
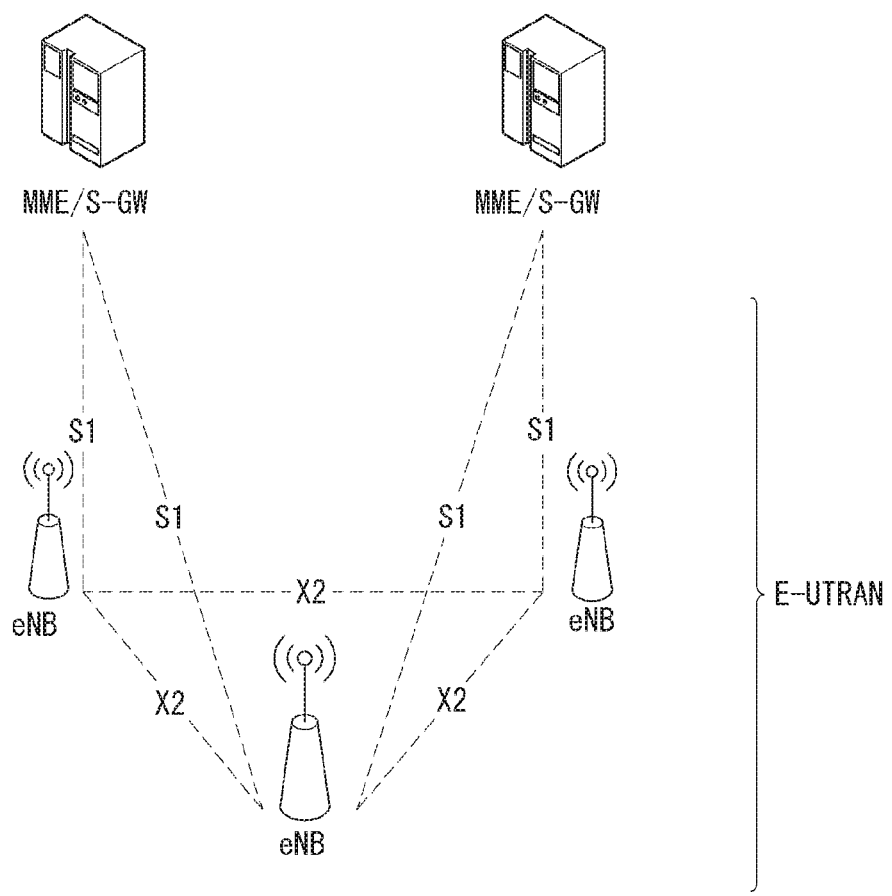
FIG. 2 illustrates an example of evolved universal terrestrial radio access network structure to which the present invention can be applied.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

Figure 3:
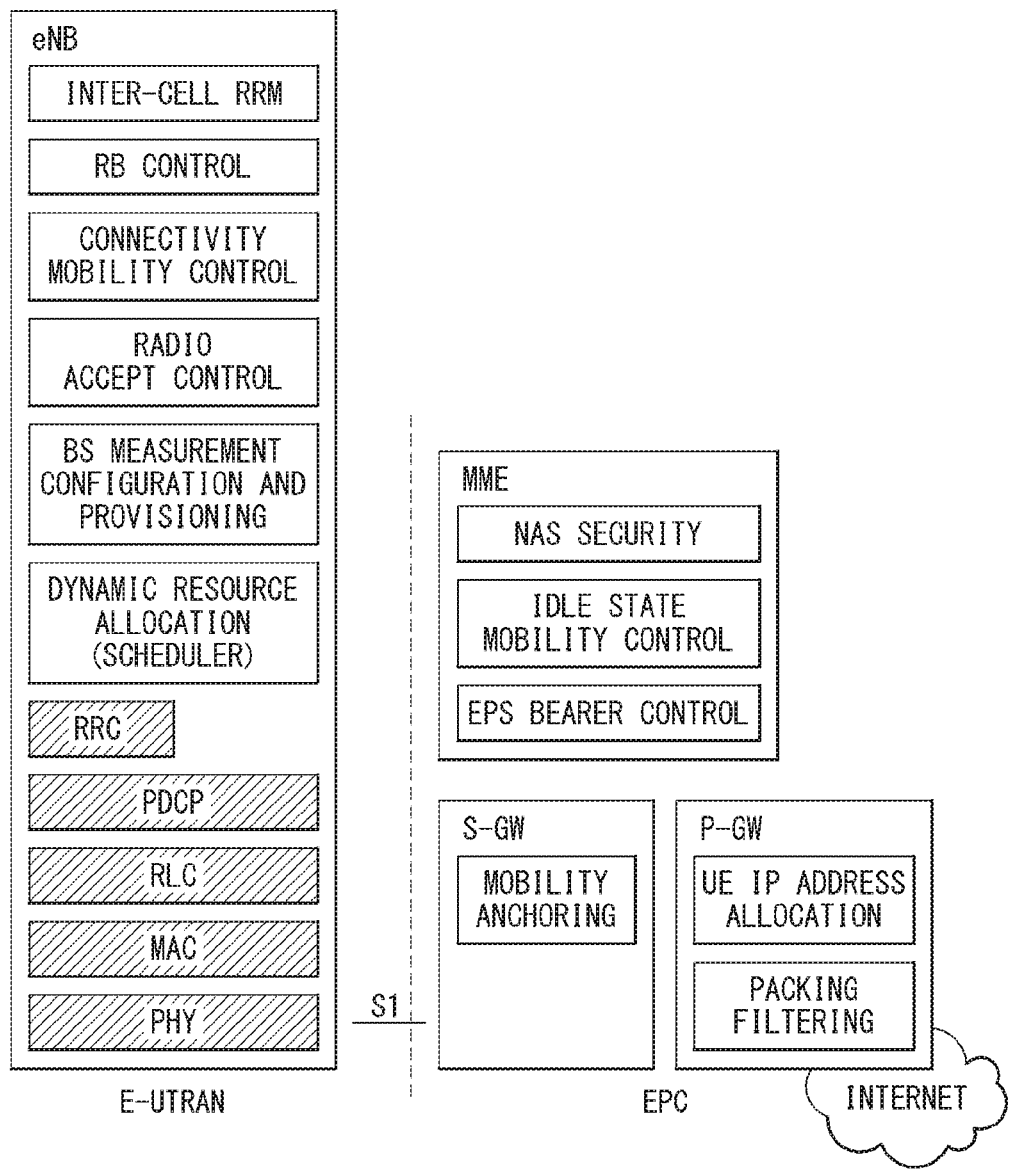
FIG. 3 exemplifies a structure of E-UTRAN and EPC in a wireless communication system to which the present invention can be applied.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

Figure 4:
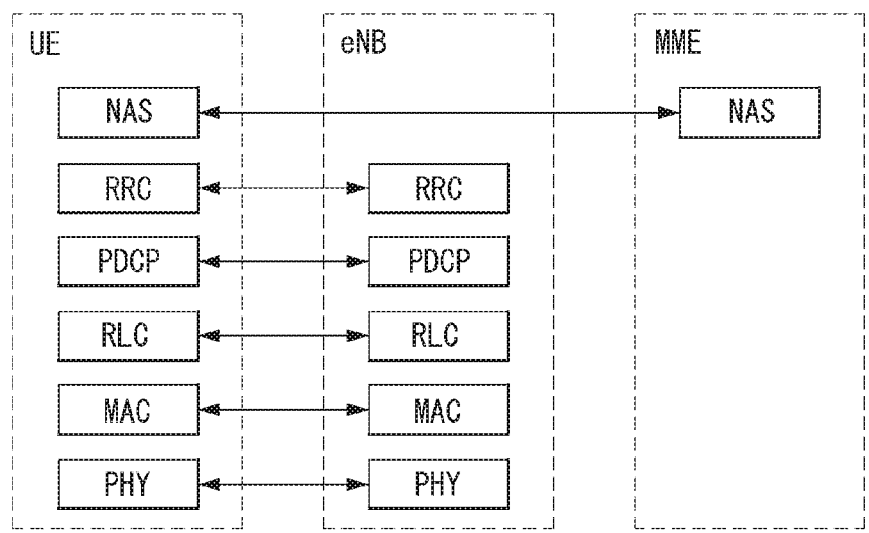
FIG. 4 illustrates a structure of a radio interface protocol between a UE and E-UTRAN in a wireless communication system to which the present invention can be applied.
Figure 4:
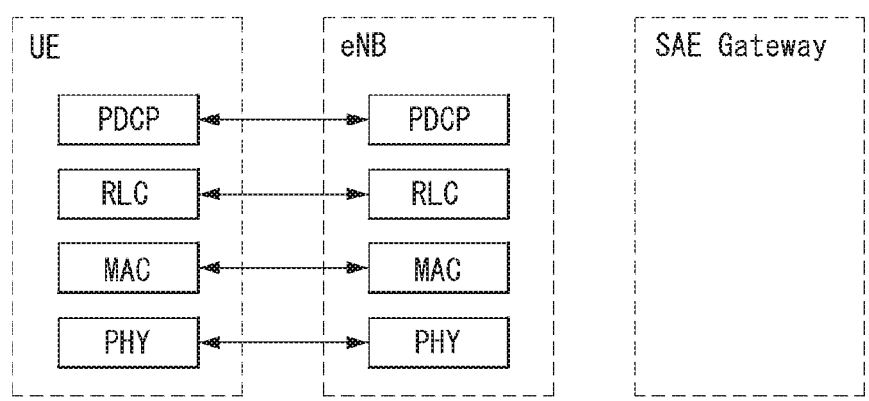

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

Figure 5:
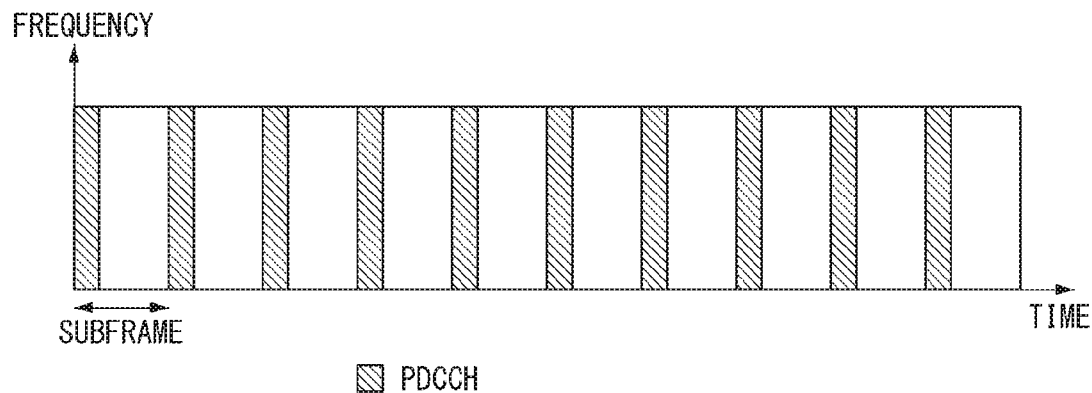
FIG. 5 is a diagram schematically showing a structure of a physical channel in a wireless communication system to which the present invention may be applied.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

New Generation Radio Access Network (NG-RAN) (or RAN) System

Terms used in a NG-RAN may be defined as follows.

Evolved Packet System (EPS): a network system including an evolved packet core (EPC), that is an Internet protocol (IP) based packet switched core network, and an access network such as LTE and UTRAN. The EPS is a network of an evolved version of a universal mobile telecommunications system (UMTS).

eNodeB: a base station of an EPS network. The eNodeB is installed outdoor, and its coverage has a scale of a macro cell.

International Mobile Subscriber Identity (IMSI): an internationally unique subscriber identity allocated in a mobile communication network.

Public Land Mobile Network (PLMN): a network configured for the purpose of providing mobile communication services to individuals. The PLMN can be configured for each operator.

5G System (5GS): a system composed of a 5G access network (AN), a 5G core network, and a user equipment (UE).

5G Access Network (5G-AN) (or AN): an access network composed of a new generation radio access network (NG-RAN) and/or a non-3GPP access network (AN) connected to the 5G core network.

New Generation Radio Access Network (NG-RAN) (or RAN): a radio access network having a common feature of being connected to 5GC and supporting one or more of the following options:
1) Standalone new radio.
2) New radio that is an anchor supporting E-UTRA extension.
3) Standalone E-UTRA (for example, eNodeB).
4) Anchor supporting new radio extension 5G core network (5GC): a core network connected to a 5G access network.

Network Function (NF): means a processing function adopted in 3GPP within a network or defined in 3GPP. The processing function includes a defined functional behavior and an interface defined in 3GPP.

NF service: a function exposed by the NF via a service-based interface and consumed by other authenticated NF(s).

Network Slice: a logical network that provides specific network capability(s) and network feature(s).

Network Slice instance: a set of NF instance(s) and required resource(s) (e.g., compute, storage, and networking resources) that form a deployed network slice.

Protocol Data Unit (PDU) Connectivity Service: service providing the exchange of PDU(s) between the UE and a data network.

PDU Session: association between the UE and the data network that provide the PDU connectivity service. An association type may be Internet protocol (IP), ethernet, or unstructured.

Non-Access Stratum (NAS): a functional layer for transceiving signaling and a traffic message between the UE and the core network in EPS and 5GS protocol stack. The NAS mainly functions to support mobility of the UE and support a session management procedure.

5G System Architecture to which the Present Invention is Applicable

A 5G system is an advanced technology from 4G LTE mobile communication technology and supports a new radio access technology (RAT), extended Long Term Evolution (eLTE) as an extended technology of LTE, non-3GPP access (e.g., wireless local area network (WLAN) access), etc. through the evolution of an existing mobile communication network structure or a clean-state structure.

The 5G system is defined based on a service, and an interaction between Network Functions (NFs) in an architecture for the 5G system can be represented in two ways as follows.

Reference point representation (see FIG. 6): indicates an interaction between NF services in NFs described by a point-to-point reference point (e.g., N11) between two NFs (e.g. AMF and SMF).

Service-based representation (see FIG. 7): network functions (e.g., AMF) within a Control Plane (CP) allow other authenticated network functions to access its services. The representation also includes a point-to-point reference point, if necessary.

Figure 6:
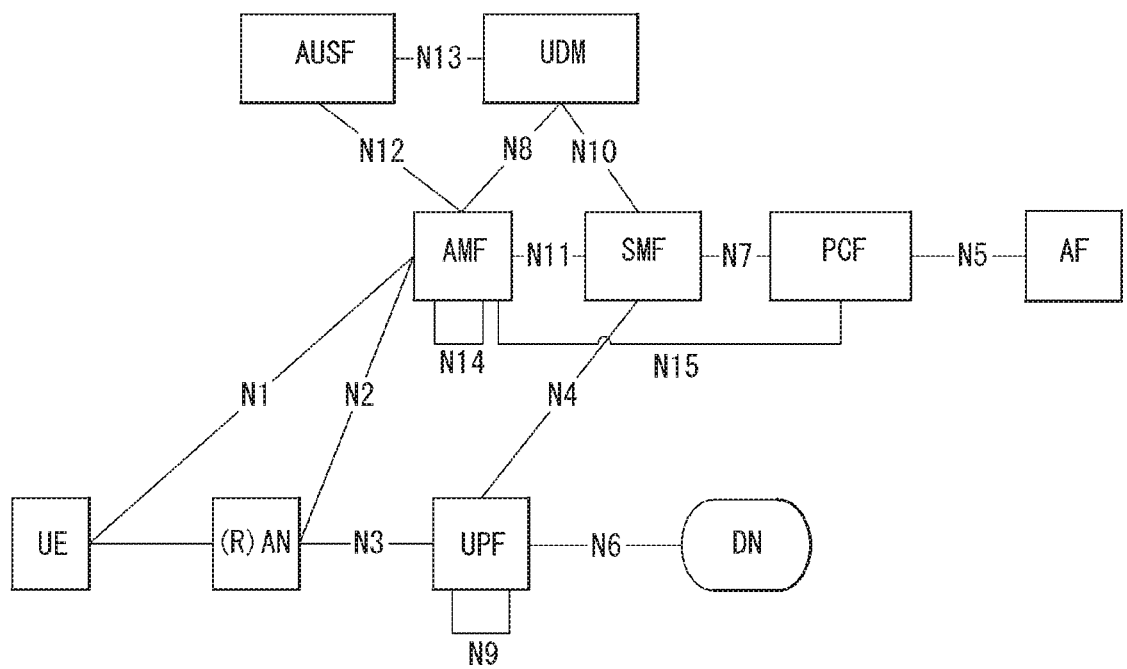
FIG. 6 illustrates a 5G system architecture using reference point representation.

FIG. 6 illustrates a 5G system architecture using reference point representation.

Referring to FIG. 6, a 5G system architecture may include various components (i.e., network functions (NFs)). FIG. 6 illustrates some of the various components, for example, an Authentication Server Function (AUSF), a (Core) Access and Mobility Management Function (AMF), a Session Management Function (SMF), a Policy Control function (PCF), an Application Function (AF), a Unified Data Management (UDM), Data network (DN), User plane Function (UPF), a (Radio) Access Network ((R)AN), and a User Equipment (UE).

Respective NFs support the following functions.

The AUSF stores data for the authentication of the UE.

The AMF provides a function for the connection and mobility management for each UE, and one AMF can be basically connected to one UE.

More specifically, the AMF supports functions of inter-CN node signaling for mobility between 3GPP access networks, termination of RAN CP interface (i.e., N2 interface), termination N1 of NAS signaling, NAS signaling security (NAS ciphering and integrity protection), AS security control, registration management (registration area management), connection management, idle mode UE reachability (including control and execution of paging retransmission), mobility management control (subscription and policy), support of intra-system mobility and inter-system mobility, support of network slicing, SMF selection, lawful intercept (for an interface to AMF event and L system), providing the delivery of a session management (SM) message between UE and SMF, transparent proxy for routing the SM message, access authentication, access authorization including roaming authority check, providing the delivery of a SMS message between UE and SMSF, Security Anchor Function (SEA) and/or Security Context Management (SCM), and the like.

Some or all of the functions of the AMF can be supported in a single instance of one AMF.

The DN means, for example, operator services, internet access, or 3rd party service. The DN transmits a downlink Protocol Data Unit (PDU) to the UPF or receives the PDU transmitted from the UE from the UPF.

The PCF receives information about packet flow from an application server and provides functions of determining policies such as mobility management and session management. More specifically, the PCF supports functions of supporting a unified policy framework for controlling a network operation, providing a policy rule so that CP function(s) (e.g., AMF, SMF, etc.) can enforce the policy rule, and implementing a front end for accessing related subscription information for policy decision in a User Data Repository (UDR).

The SMF provides a session management function. If the UE has a plurality of sessions, the sessions can be respectively managed by different SMFs.

More specifically, the SMF supports functions of session management (e.g., session establishment, modification, and release, including tunnel maintenance between the UPF and the AN node), UE IP address allocation and management (including optional authentication), selection and control of UP function, configuring traffic steering at UPF to route traffic to proper destination, termination of interfaces toward policy control functions, enforcement of control part of a policy and QoS, lawful intercept (for an interface to SM event and L1 system), termination of SM part of a NAS message, downlink data notification, an initiator of AN specific SM information (sent to AN via the AMF over N2), SSC mode decision of the session, a roaming function, and the like.

Some or all of the functions of the SMF can be supported within a single instance of one SMF.

The UDM stores subscription data of user, policy data, etc. The UDM includes two parts, i.e., application front end (FE) and User Data Repository (UDR).

The FE includes UDM FE taking charge of location management, subscription management, processing of credential, etc. and PCF taking charge of policy control. The UDR stores data required for functions provided by the UDM-FE and a policy profile required by the PCF. Data stored in the UDR includes user subscription data including subscription identifier, security credential, access and mobility related subscription data, and session related subscription data and policy data. The UDM-FE accesses subscription information stored in the UDR and supports functions of Authentication Credential Processing, User Identification Handling, access authentication, registration/mobility management, subscription management, SMS management, and the like.

The UPF transmits the downlink PDU received from the DN to the UE via the (R)AN and transmits the uplink PDU received from the UE to the DN via the (R)AN.

More specifically, the UPF supports functions of anchor point for intra/inter RAT mobility, external PDU session point of interconnect to Data Network (DN), packet routing and forwarding, packet inspection and user plane part of policy rule enforcement, lawful intercept, reporting of traffic usage, uplink classifier to support routing traffic flow to Data Network (DN), branching point to support multi-homed PDU session, QoS handling (e.g., packet filtering, gating, uplink/downlink rate enforcement) for user plane, uplink traffic verification (SDF mapping between service data flow (SDF) and QoS flow), transport level packet marking in the uplink and downlink, downlink packet buffering and downlink data notification triggering, and the like. Some or all of the functions of the UPF can be supported in a single instance of one UPF.

AF interacts with 3GPP core network to provide services (e.g., support functions of an application influence on traffic routing, network capability exposure access, interaction with policy framework for policy control, and the like).

(R)AN collectively refers to a new radio access network supporting both evolved E-UTRA, that is an evolved version of 4G radio access technology, and a New Radio (NR) access technology (e.g., gNB).

gNB supports functions of radio resource management function (i.e., radio bearer control, radio admission control, connection mobility control, dynamic allocation of resources to the UE in uplink/downlink (scheduling)), Internet protocol (IP) header compression, encryption of user data stream and integrity protection, selection of AMF upon attachment of the UE if routing to the AMF is not determined from information provided to the UE, routing of user plane data to UPF(s), routing of control plane information to ANF, connection setup and release, scheduling and transmission of a paging message (generated from the AMF), scheduling and transmission of system broadcast information (generated from the AMF or operating and maintenance (O&M)), measurement and measurement reporting configuration for mobility and scheduling, transport level packet marking in uplink, session management, support of network slicing, QoS flow management and mapping to data radio bearer, support of a UE in an inactive mode, NAS message distribution function, NAS node selection function, radio access network sharing, dual connectivity, tight interworking between NR and E-UTRA, and the like.

The UE means a user equipment. The user equipment may be referred to as a term such as a terminal, a mobile equipment (ME), and a mobile station (MS). The user equipment may be a portable device such as a notebook computer, a cellular phone, a personal digital assistant (PDA), a smart phone, and a multimedia device, or a non-portable device such as a personal computer (PC) and a vehicle-mounted device.

Although unstructured data storage network function (UDSF), structured data storage network function (SDSF), network exposure function (NEF), and NF repository function (NRF) are not shown in FIG. 6 for clarity of explanation, all the NFs shown in FIG. 6 can perform interaction with the UDSF, the NEF and the NRF, if necessary.

The NEF provides a means to securely expose services and capabilities provided by 3GPP network functions, for example, 3rd party, internal exposure/re-exposure, application function, and edge computing. The NEF receives information from other network function(s) (based on exposed capabilities of other network function(s)). The NEF can store the received information as structured data using a standardized interface to a data storage network function. The stored information can be re-exposed by the NEF to other network functions and other application functions and can be used for other purposes such as analysis.

The NRF supports a service discovery function. The NRF receives NF Discovery Request from NF instance and provides information of the discovered NF instance to the NF instance. The NRF also maintains available NF instances and their supported services.

The SDSF is structured data by any NEF and is a selective function to support a storage and retrieval function of information.

The UDSF is unstructured data by any NF and is a selective function to support a storage and retrieval function of information.

FIG. 6 illustrates a reference model where the UE accesses one DN using one PDU session, for convenience of explanation. However, the present invention is not limited thereto.

The UE can simultaneously access two (i.e., local and central) data networks using multiple PDU sessions. In this instance, two SMFs may be selected for different PDU sessions. Each SMF may have a capability capable of controlling both local UPF and central UPF within the PDU session.

Further, the UE can simultaneously access two (i.e., local and central) data networks provided within a single PDU session.

In the 3GPP system, a conceptual link connecting between the NFs in the 5G system is defined as a reference point. The following illustrates reference points included in the 5G system architecture as represented in FIG. 6.

N1: Reference point between the UE and the AMF
N2: Reference point between the (R)AN and the AMF
N3: Reference point between the (R)AN and the UPF
N4: Reference point between the SMF and the UPF
N5: Reference point between the PCF and the AF
N6: Reference point between the UPF and the data network
N7: Reference point between the SMF and the PCF
N24: Reference point between the PCF in the visited network and the PCF in the home network
N8: Reference point between the UDM and the AMF
N9: Reference point between two core UPFs
N10: Reference point between the UDM and the SMF
N11: Reference point between the AMF and the SMF
N12: Reference point between the AMF and the AUSF
N13: Reference point between UDM and Authentication Server function (AUSF)
N14: Reference point between two AMFs
N15: Reference point between the PCF and the AMF in case of non-roaming scenario, reference point between PCF in the visited network and AMF in case of roaming scenario
N16: Reference point between two SMFs (reference point between the SMF in the visited network and the SMF in the home network in case of roaming scenario)
N17: Reference point between AMF and EIR
N18: Reference point between any NF and UDSF
N19: Reference point between NEF and SDSF FIG. 7 illustrates a 5G system architecture using service-based representation.

Figure 7:
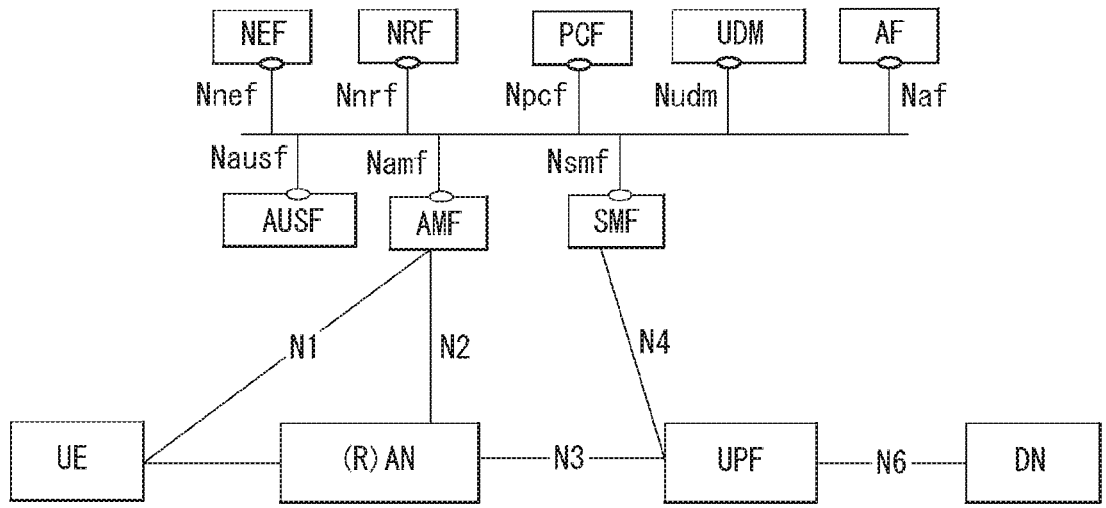
FIG. 7 illustrates a 5G system architecture using service-based representation.

Service-based interfaces illustrated in FIG. 7 indicate a set of services provided/exposed by a predetermined NF. The service-based interfaces are used in control plane. The following illustrates the service-based interfaces included in the 5G system architecture as represented in FIG. 6.

Namf: Service-based interface exhibited by the AMF
Nsmf: Service-based interface exhibited by the SMF
Nnef: Service-based interface exhibited by the NEF
Npcf: Service-based interface exhibited by the PCF
Nudm: Service-based interface exhibited by the UDM
Naf: Service-based interface exhibited by the AF
Nnrf: Service-based interface exhibited by the NRF
Nausf: Service-based interface exhibited by the AUSF The NF service is one type of capability exposed by an NF (i.e., NF service producer) to other NF (i.e., NF service consumer) via the service-based interface. The NF can expose one or more NF service(s). The following standard is applied to define the NF service.

The NF services are derived from information flow for explaining an end-to-end function.
Complete end-to-end message flow is explained by a sequence of NF service invocation.
Two operations that the NF(s) provide its services via the service-based interface are as follows:

i) "Request-response": A control plane NF_B (i.e., NF service producer) is requested from another control plane NF_A (i.e., NF service consumer) to provide a certain NF service (including performing an operation and/or providing information). The NF_B responses NF service result based on information provided by the NF_A in the Request.

In order to fulfill the request, the NF_B may in turn consume NF services from other NF(s). In Request-response mechanism, communication is performed one to one between two NFs (i.e., consumer and producer).

ii) "Subscribe-Notify"

A control plane NF_A (i.e., NF service consumer) subscribes to a NF service provided by another control plane NF_B (i.e., NF service producer). Multiple control plane NFs may subscribe to the same control plane NF service. The NF_B notifies a result of this NF service to the interested NFs that are subscribed to this NF service. A subscription request from the consumer may include a notification request for periodic update or notification triggered through specific events (e.g., change of requested information, reaching a certain critical value, etc.). This mechanism also includes the case where the NF(s) (e.g., NF_B) implicitly subscribes to a specific notice without an explicit subscription request (e.g., the case where the NF(s) subscribes through a successful registration procedure).

Figure 8:
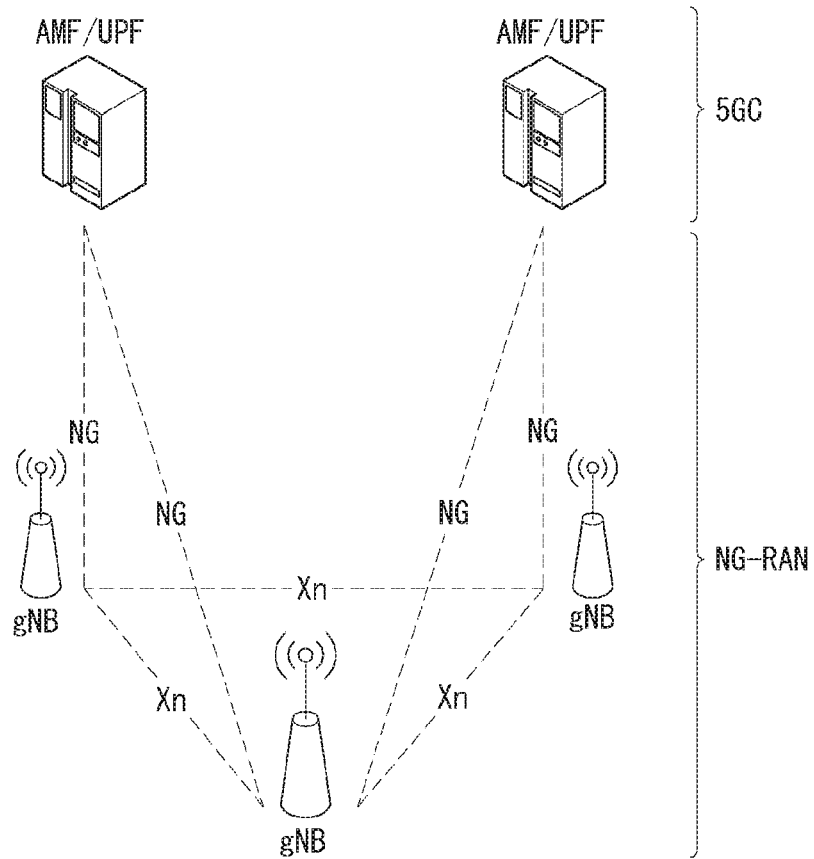
FIG. 8 illustrates an NG-RAN architecture to which the present invention is applicable.

FIG. 8 illustrates an NG-RAN architecture to which the present invention is applicable.

Referring to FIG. 8, a new generation radio access network (NG-RAN) includes gNB (NR NodeB)(s) and/or eNB (eNodeB)(s) providing a user plane toward a UE and termination of control plane protocol.

The gNB(s) are interconnected using an Xn interface, and the eNB(s) connected to the gNB(s) and 5GC are also interconnected using the Xn interface. The gNB(s) and the eNB(s) are connected to the 5GC using an NG interface. More specifically, the gNB(s) and the eNB(s) are connected to the AMF using an NG-C interface (i.e., N2 reference point) that is a control plane interface between the NG-RAN and the 5GC, and are connected to the UPF using an NG-U interface (i.e., N3 reference point) that is a user plane interface between the NG-RAN and the 5GC.

Radio Protocol Architecture

Figure 9:
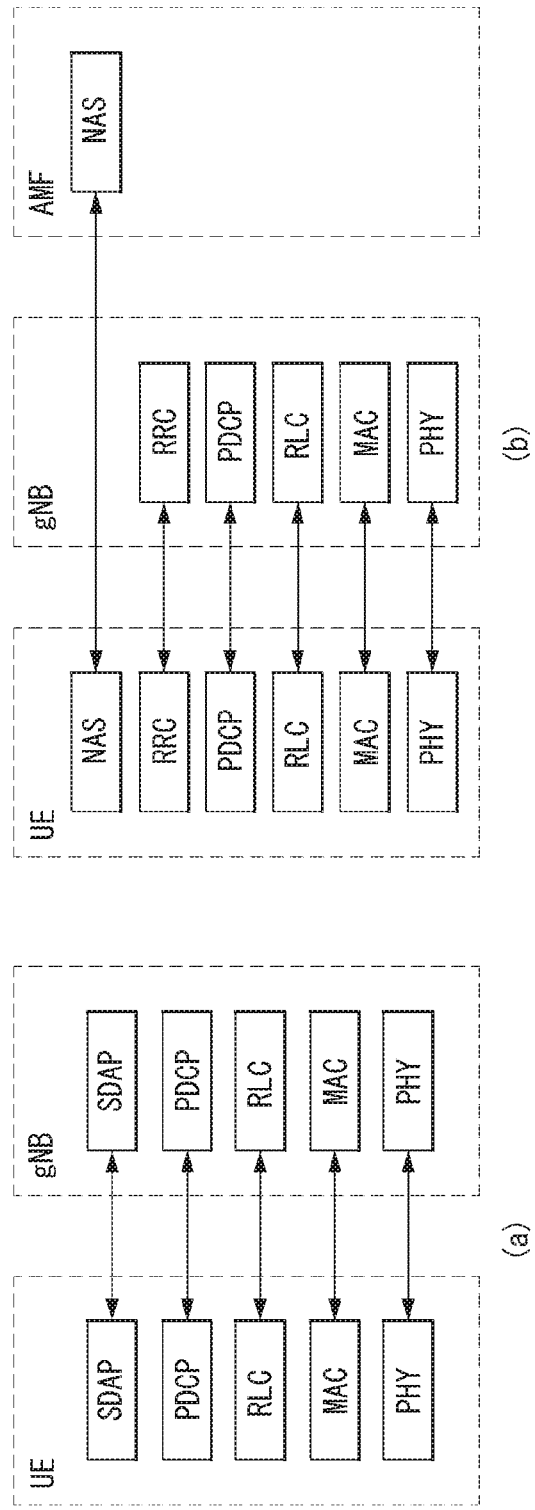
FIG. 9 illustrates a radio protocol stack to which the present invention is applicable.

FIG. 9 illustrates a radio protocol stack to which the present invention is applicable. More specifically, FIG. 9(a) illustrates a radio interface user plane protocol stack between a UE and gNB, and FIG. 9(b) illustrates a radio interface control plane protocol stack between the UE and the gNB.

The control plane means a path through which control messages used for a UE and a network to manage calls are transmitted. The user plane means a path through which data generated in an application layer, for example, voice data, Internet packet data, and so on are transmitted.

Referring to FIG. 9(a), the user plane protocol stack may be divided into Layer 1 (i.e., physical (PHY) layer) and Layer 2.

Referring to FIG. 9(b), the control plane protocol stack may be divided into Layer 1 (i.e., PHY layer), Layer 2, Layer 3 (i.e., radio resource control (RRC) layer), and a non-access stratum (NAS) layer.

The Layer 2 is divided into a medium access control (MAC) sublayer, a radio link control (RLC) sublayer, a packet data convergence protocol (PDC) sublayer, and a service data adaptation protocol (SDAP) sublayer (in case of the user plane).

A radio bearer is classified into two groups: data radio bearer (DRB) for user plane data and signaling radio bearer (SRB) for control plane data.

Each layer of the control plane and the user plane of the radio protocol is described below.

1) The Layer 1, i.e., the PHY layer, provides information transfer service to an upper layer by using a physical channel. The PHY layer is connected to the MAC sublayer located at an upper level through a transport channel, and data are transmitted between the MAC sublayer and the PHY layer through the transport channel. The transport channel is classified according to how and which feature data is transmitted via a radio interface. And, data is transmitted between different PHY layers, between a PHY layer of a transmitter and a PHY layer of a receiver, through a physical channel.

2) The MAC sublayer performs mapping between a logical channel and a transport channel; multiplexing/de-multiplexing of MAC service data unit (SDU) belonging to one or different logical channel(s) to/from a transport block (TB) delivered to/from the PHY layer through a transport channel; scheduling information reporting; error correction through hybrid automatic repeat request (HARQ); priority handling between UEs using dynamic scheduling; priority handling between logical channels of one UE using logical channel priority; and padding.

Different kinds of data deliver a service provided by the MAC sublayer. Each logical channel type defines what type of information is delivered.

The logical channel is classified into two groups: a control channel and a traffic channel.

i) The Control Channel is used to deliver only control plane information and is as follows.

Broadcast Control Channel (BCCH): a downlink channel for broadcasting system control information.

Paging Control Channel (PCCH): a downlink channel that delivers paging information and system information change notification.

Common Control Channel (CCCH): a channel for transmitting control information between a UE and a network. This channel is used for UEs having no RRC connection with the network.

Dedicated Control Channel (DCCH): a point-to-point bi-directional channel for transmitting dedicated control information between the UE and the network. This channel is used by the UE having an RRC connection.

ii) The traffic channel is used to use only user plane information.

Dedicated Traffic Channel (DTCH): a point-to-point channel, dedicated to a single UE, for delivering user information. The DTCH may exist in both uplink and downlink.

In the downlink, connection between the logical channel and the transport channel is as follows.

The BCCH may be mapped to BCH. The BCCH may be mapped to DL-SCH.

The PCCH may be mapped to PCH. The CCCH may be mapped to the DL-SCH. The DCCH may be mapped to the DL-SCH. The DTCH may be mapped to the DL-SCH.

In the uplink, connection between the logical channel and the transport channel is as follows. The CCCH may be mapped to UL-SCH. The DCCH may be mapped to the UL-SCH. The DTCH may be mapped to the UL-SCH.

3) The RLC sublayer supports three transmission modes: a transparent mode (TM), an unacknowledged mode (UM), and an acknowledged mode (AM).

The RLC configuration may be applied for each logical channel. In case of SRB, the TM or the AM is used. On the other hand, in case of DRB, the UM the AM is used.

The RLC sublayer performs the delivery of the upper layer PDU; sequence numbering independent of PDCP; error correction through automatic repeat request (ARQ); segmentation and re-segmentation; reassembly of SDU; RLC SDU discard; and RLC re-establishment.

4) A PDCP sublayer for the user plane performs sequence numbering; header compression and decompression (robust header compression (RoHC) only); delivery of user data; reordering and duplicate detection (if the delivery to a layer above the PDCP is required); PDCP PDU routing (in case of a split bearer); re-transmission of PDCP SDU; ciphering and deciphering; PDCP SDU discard; PDCP re-establishment and data recovery for RLC AM; and duplication of PDCP PDU.

The PDCP sublayer for the control plane additionally performs Sequence Numbering; ciphering, deciphering and integrity protection; delivery of control plane data; duplicate detection; and duplication of PDCP PDU.

When duplication is configured for a radio bearer by RRC, an additional RLC entity and an additional logical channel are added to the radio bearer to control the duplicated PDCP PDU(s). The duplication at PDCP includes transmitting the same PDCP PDUs twice. Once it is transmitted to the original RLC entity, and a second time it is transmitted to the additional RLC entity. In this instance, the original PDCP PDU and the corresponding duplicate are not transmitted to the same transport block. Two different logical channels may belong to the same MAC entity (in case of CA) or different MAC entities (in case of DC). In the former case, logical channel mapping restriction is used to ensure that the original PDCP PDU and the corresponding duplicate are not transmitted to the same transport block.

5) The SDAP sublayer performs i) mapping between QoS flow and data radio bearer, and ii) QoS flow identification (ID) marking in downlink and uplink packet.

A single protocol entity of SDAP is configured for each individual PDU session, but exceptionally, in case of dual connectivity (DC), two SDAP entities can be configured.

6) A RRC sublayer performs broadcast of system information related to access stratum (AS) and non-access stratum (NAS); paging initiated by 5GC or NG-RAN; establishment, maintenance and release of RRC connection between UE and NG-RAN (additionally including modification and release of carrier aggregation and also additionally including modification and release of dual connectivity between E-UTRAN and NR or in NR); security function including key management; establishment, configuration, maintenance and release of SRB(s) and DRB(s); delivery of handover and context; UE cell selection and re-release and control of cell selection/reselection: mobility function including inter-RAT mobility; QoS management function, UE measurement reporting and control of reporting; detection of radio link failure and recovery from radio link failure; and NAS message delivery from NAS to UE and NAS message delivery from UE to NAS.

Network Slicing

The 5G system has introduced a network slicing technology providing network resources and network functions as individual slices according to each service.

With the introduction of network slicing, isolation, independent management, etc. of a network function and a network resource may be provided per each slice. Hence, the network slicing may select and combine network functions of the 5G system according to services, users, etc., thereby providing independent and more flexible services per the service and the user The network slice refers to a logically combined network of an access network and a core network.

The network slice may include one or more of the following:

core network control plane and user plane function

NG-RAN non-3GPP interworking function (N3IWF) of non-3GPP access network

Supported function and network function optimization may differ per each network slice. Multiple network slice instances may provide the same function for different groups of UEs.

A single UE may be simultaneously connected to one or more network slice instances via a 5G-AN. The single UE may be served by at most eight network slices at a time. An AMF instance serving the UE may belong to each network slice instance serving the UE. That is, the AMF instance may be common to the network slice instance serving the UE. CN part of the network slice instance(s) serving the UE is selected by the CN.

One PDU session belongs to only one specific network slice instance per PLMN. Different network slice instances do not share the one PDU session.

One PDU session belongs to one specific network slice instance per PLMN.

Different slices may have slice-specific PDU sessions using the same DNN, but different network slice instances do not share the one PDU session.

Single network slice selection assistance information (S-NSSAI) identifies a network slice. Each S-NSSAI is assistance information used for a network to select a specific network slice instance. NSSAI is a set of S-NSSAI(s). The S-NSSAI includes the following:

Slice/service type (SST): SST indicates an expected operation of the network slice in terms of function and service.

Slice differentiator (SD): SD is optional information that complements SST(s) for selecting a network slice instance from a plurality of potentially network slice instances that complies with all of the indicated SSTs.

1) Network Slice Selection Upon Initial Connection

A UE may be configured with a configured NSSAI per PLMN by home PLMN (HPLMN). The configured NSSAI is PLMN-specific, and the HPLMN indicates PLMN(s) to which each configured NSSAI is applied.

Upon initial connection of the UE, an RAN selects an initial network slice which will send a message using the NSSAI. To this end, in a registration procedure, the UE provides a requested NSSAI to a network. When the UE provides the requested NSSAI to the network, the UE in a predetermined PLMN uses only S-NSSAIs belonging to the configured NSSAI of a corresponding PLMN.

If the UE does not provide the NSSAI to the RAN or the RAN does not select a proper network slice according to the provided NSSAI, the RAN may select a default network slice.

Subscription data include S-NSSAI(s) of network slice(s) to which the UE subscribes. One or more S-NSSAIs may be marked as default S-NSSAI. If the S-NSSAI is marked as default, the network can serve the UE with the related network slice even when the UE does not send any S-NSSAI to the network in a registration request.

If the UE is successfully registered, a CN informs (R)AN by providing whole allowed NSSAI (including one or more S-NSSAIs). Further, when a registration procedure of the UE is successfully completed, the UE may obtain the allowed NSSAI for this PLMN from the AMF.

The allowed NSSAI takes precedence over the configured NSSAI for this PLMN. The UE uses only the S-NSSAI(s) in the allowed NSSAI corresponding to a network slice for a subsequent network slice selection related procedure in the serving PLMN.

For each PLMN, the UE stores the configured NSSAI and the Allowed NSSAI (if any). When the UE receives an Allowed NSSAI for a PLMN, it overrides a previously stored allowed NSSAI for this PLMN.

2) Slice Change

A network can change an already selected network slice instance according to a local policy, UE mobility, change in subscription information, etc. That is, a set of network slices for the UE can be changed at any time while the UE is registered with the network. Further, change in the set of network slices for the UE may be initiated by the network or the UE under specific conditions.

Based on a local policy, change in subscription information, and/or UE mobility, the network may change a set of permitted network slice(s) to which the UE is registered. The network may perform such change during a registration procedure or notify the UE of change in supported network slice(s) using a procedure which can trigger a registration procedure.

Upon change of the network slice, the Network may provide the UE with a new allowed NSSAI and a tracking area list. The UE includes a new NSSAI in signaling according to a mobility management procedure to transmit it and thus causes reselection of a slice instance. According to the change of the network slice, an AMF supporting this may be changed.

If the UE enters an area where a network slice is no longer available, a core network releases PDU sessions for an S-NSSAI corresponding to a network slice that is no longer available via a PDU session release procedure.

When the PDU sessions corresponding to a slice that is no longer available are released, the UE uses a UE policy to determine whether an existing traffic can be routed over PDU sessions belonging to other slices.

In order to change a set of S-NSSAI(s) being used, the UE initiates a registration procedure.

3) SMF Selection

A PCF provides a network slice selection policy (NSSP) to the UE. The NSSP associates the UE with an S-NSSAI and is used by the UE so as to determine PDU sessions when a traffic is routed.

The NSSP is provided per application of the UE, and it includes a rule capable of mapping the S-NSSAI per the UE application. An AMF selects a SMF for PDU session management using subscription information, a local provider policy, etc. together with SM-NSSAI and DNN information delivered by the UE.

When a PDU session for a specific slice instance is established, the CN provides the (R)AN with the S-NSSAI corresponding to the slice instance to which the PDU session belongs so that the RAN can access a specific function of the slice instance.

Session Management

The 5GC supports a PDU connectivity service, i.e., a service that provides exchange of PDU(s) between a UE and a data network (DN) identified by a data network name (DNN) (or access point name (APN)). The PDU connectivity service is supported via PDU sessions that are established upon request from the UE.

Each PDU session supports a single PDU session type. That is, each PDU session supports the exchange of a single type of PDU requested by the UE upon establishment of the PDU session. The following PDU session type is defined: IP version 4 (IPv4), IP version 6 (IPv6), ethernet, and unstructured. Here, the type of PDU exchanged between the UE and the DN is completely transparent to the 5G system.

The PDU sessions are established (upon UE requests), modified (upon UE and 5GC request), and released (upon UE and 5GC request) using NAS SM signaling exchanged over N1 between the UE and a SMF. Upon request from an application server, the 5GC can trigger a specific application in the UE. If the UE receives a trigger message, the UE may deliver the corresponding message to an identified application, and the identified application may establish a PDU session to a specific DNN.

The SMF checks whether the UE request is compliant with user subscription information. To this end, the SMF obtains SMF level subscription data from an UDM. Such data may indicate the allowed PDU session type per DNN.

The UE that is registered over multiple accesses selects an access for establishing a PDU session.

The UE may request to move a PDU session between 3GPP and non-3GPP accesses. A decision to move the PDU session between the 3GPP and non-3GPP accesses is made on a per PDU session basis. That is, the UE may have PDU sessions using the 3GPP access while other PDU sessions use the non-3GPP access.

In a PDU session establishment request transmitted from the network, the UE provides a PDU session identity (Id). The UE may also provide a PDU session type, slicing information, DNN, and a service and session continuity (SSC) mode.

The UE may simultaneously establish multiple PDU sessions via the 3GPP access and/or the non-3GPP access with the same DN or different DNs.

The UE may establish multiple PDU sessions with the same DN served by different UPF terminations N6.

The UE having the multiple established PDU sessions may be served by different SMFs.

A user plane path of different PDU sessions (with the same DNN or different DNNs) belonging to the same UE may be completely separated between the UPF interfacing with the DN and the AN.

The 5G system architecture can satisfy various continuity requirements of different applications/services in the UE by supporting session and service continuity (SSC). The 5G system supports different SSC modes. A SSC mode related to a PDU session anchor is not changed while the PDU session is established.

In case of a PDU session to which SSC mode 1 is applied, the network preserves the connectivity service provided to the UE. In case of a PDU session of IP type, an IP address is preserved.

In case of using SSC mode 2, the network may release the connectivity service delivered to the UE and also release the corresponding PDU session. In case of a PDU session of IP type, the network may release IP address(es) that had been allocated to the UE.

In case of using SSC mode 3, changes in the user plane is visible to the UE, while the network ensures that the UE suffers no loss of connectivity. A connection through a new PDU session anchor point is established before the previous connection is terminated, in order to allow for better service continuity. In case of a PDU session of IP type, the IP address is not preserved in this mode during relocation of the anchor.

A SSC mode selection policy is used to determine a type of SSC mode associated with an application (or application group) of the UE. An operator may previously configure the SSC mode selection policy to the UE. This policy includes one or more SSC mode selection policy rules which can be used by the UE to determine a type of SSC mode associated with an application (or application group). This policy may also include a default SSC mode selection policy rule that can be applied to all applications of the UE.

If the UE provide an SSC mode when requesting a new PDU session, the SMF selects either accepting the requested SSC mode or modifying the requested SSC mode based on subscription information and/or local configuration. If the UE does not provide an SSC mode when requesting a new PDU session, the SMF selects a default SSC mode for data network listed in the subscription information or applies local configuration for selecting the SSC mode.

The SMF informs the UE of the selected SSC mode for the PDU session.

Mobility Management

Registration management (RM) is used to register or de-register the UE/user to a network and establish user context in the network.

1) Registration Management

The UE/user needs to register with the network to receive service that requires registration. After the registration is performed once, if applicable, the UE can update its registration to the network to periodically maintain the reachability (i.e., periodic registration update), or update its capability or re-negotiate protocol parameters upon movement (mobility registration update).

An initial registration procedure includes execution of a network access control function (i.e., user authentication and access authentication based on a subscription profile in the UDM). As a result of the registration procedure, identification of serving AMF is registered in the UDM.

Figure 10:
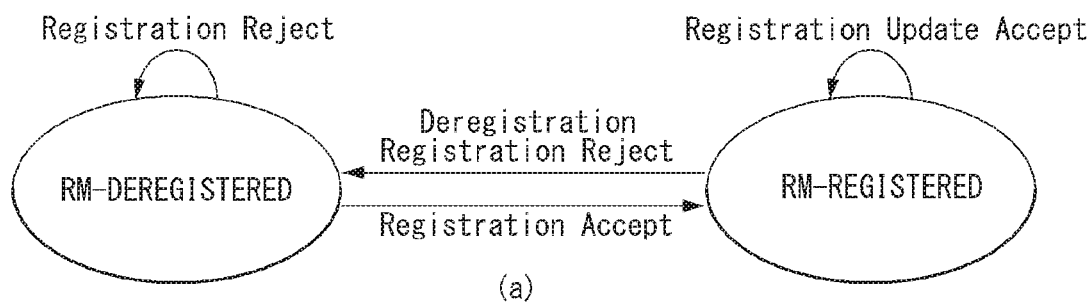
FIG. 10 illustrates a RM state model to which the present invention is applicable.
Figure 10:
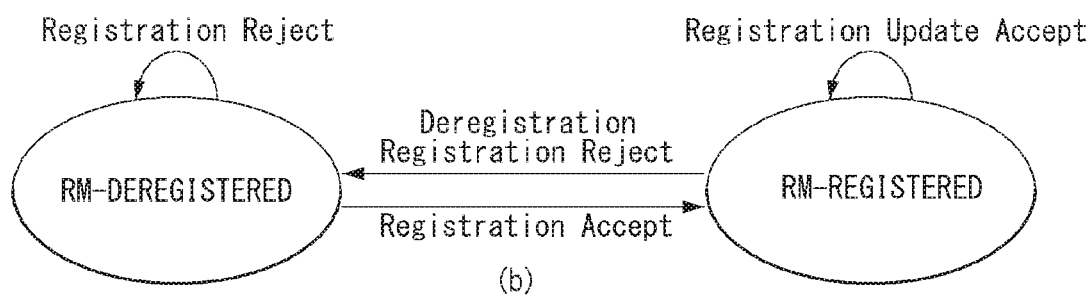

FIG. 10 illustrates a RM state model to which the present invention is applicable. More specifically, FIG. 10(*a*) illustrates a RM state model in the UE, and FIG. 10(*a*) illustrates a RM state model in the AMF.

Referring to FIG. 10, two RM states of RM-DEREGISTERED and RM-REGISTERED are used in the UE and the AMF to reflect a registration state of the UE in selected PLMN.

In the RM-DEREGISTERED state, the UE is not registered with the network. The UE context in the AMF does not maintain a valid location or routing information for the UE, and thus the UE is not reachable by the AMF. However, for example, some UE context may be still stored in the UE and the AMF to prevent an authentication procedure from being performed during every registration procedure.

In the RM-DEREGISTERED state, if the UE needs to receive service that requires registration, the UE attempts to register with the selected PLMN using the initial registration procedure. Or, if the UE receives Registration Reject at initial registration, the UE remains in the RM-DEREGISTERED state. On the other hand, the UE enters the RM-REGISTERED state when receiving Registration Accept.

In the RM-DEREGISTERED state, when applicable, the AMF accepts the initial registration of the UE by sending Registration Accept to the UE and enters the RM-REGISTERED state. Or, when applicable, the AMF rejects the initial registration of the UE by sending Registration Reject to the UE.

In the RM-REGISTERED state, the UE is registered with the network. In the RM-REGISTERED state, the UE can receive service that requires registration with the network.

In the RM-REGISTERED state, if there is no tracking area identity (TAI) of a current serving cell on a list of the TAI that the UE has received from the network, the UE performs a mobility registration update procedure in order to maintain the registration of the UE and enable the AMF to page the UE. Or, the UE performs a periodic registration update procedure triggered by the expiration of a periodic update timer in order to notify the network that the UE is still in an active state. Or, the UE performs a registration update procedure in order to update its capability information or re-negotiate protocol parameters with the network. Or, when the UE needs to be no longer registered with the PLMN, the UE performs a deregistration procedure and enters the RM-DEREGISTERED state. The UE can decide to deregister from the network at any time. Or, when the UE receives a Registration Reject message or a Deregistration message or when the UE performs a local deregistration procedure without the initiation of any signaling, the UE enters the RM-DEREGISTERED state.

In the RM-REGISTERED state, when the UE needs to be no longer registered with the PLMN, the AMF performs a deregistration procedure and enters the RM-DEREGISTERED state. The AMF can decide to deregister the UE at any time. Or, after an implicit deregistration timer expires, the AMF performs implicit deregistration at any time. The AMF enters the RM-DEREGISTERED state after the implicit deregistration. Or, the AMF performs local deregistration for the UE that have negotiated to perform deregistration at an end of communication. The AMF enters the RM-DEREGISTERED state after the local deregistration. Or, when applicable, the AMF accepts or rejects the registration update from the UE. When the AMF rejects the registration update from the UE, the AMF may reject the UE registration.

Registration area management includes functions of allocating and re-allocating a registration area to the UE. The registration area is managed per the access type (i.e., 3GPP access or non-3GPP access).

When the UE is registered with the network over the 3GPP access, the AMF allocates a set of tracking area(s) (TAs) in a TAI list to the UE. When the AMF allocates the registration area (i.e., the set of the TAs in the TAI list), the AMF may consider various information (for example, mobility pattern, allowed/non-allowed area, etc.). The AMF having whole PLMN (all PLMN) as a serving area may allocate the whole PLMN as the registration area to the UE that is in a MICO mode.

The 5G system supports allocation of a TAI list including different 5G-RAT(s) in a single TAI list.

When the UE is registered with the network over the non-3GPP access, a registration area for the non-3GPP access corresponds to a unique reserved TAI value (i.e., dedicated to the non-3GPP access). Thus, there is a unique TA for the non-3GPP access to 5GC, and this is called N3GPP TAI.

The AMF includes only TAI(s) applicable to an access, to which the TAI list is transmitted, when generating the TAI list.

2) Connection Management

Connection management (CM) is used to establish and release signaling connection between the UE and the AMF. The CM includes functions of establishing and releasing signaling connection between the UE and the AMF over N1. The signaling connection is used to enable NAS signaling exchange between the UE and a core network. The signaling connection includes both AN signaling connection for the UE between the UE and the AN and N2 connection for the UE between the AN and the AMF.

Figure 11:
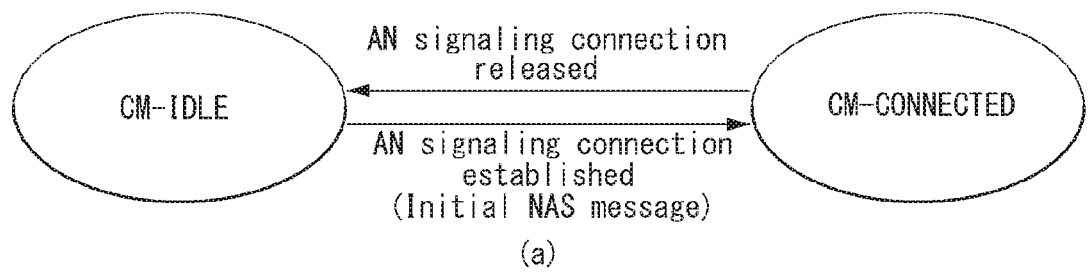
FIG. 11 illustrates a CM state model to which the present invention is applicable.
Figure 11:
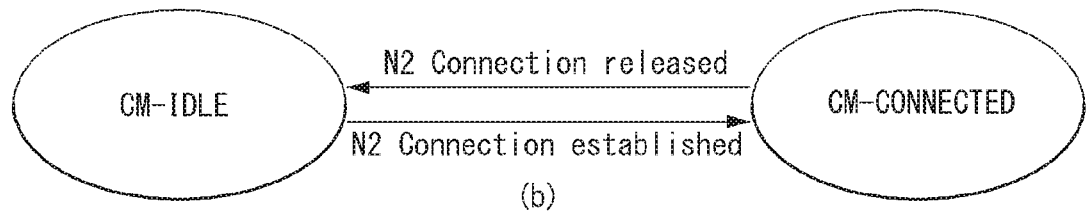

FIG. 11 illustrates a CM state model to which the present invention is applicable. More specifically, FIG. 11(a) illustrates CM state transition in the UE, and FIG. 11(a) illustrates CM state transition in the AMF.

Referring to FIG. 11, two CM states of CM-IDLE and CM-CONNECTED are used to reflect NAS signaling connection of the UE with the AMF.

The UE in a CM-IDLE state is in an RM-REGISTERED state and does not have the NAS signaling connection established with the AMF over N1. The UE performs cell selection, cell re-selection, and PLMN selection.

There are no AN signaling connection, N2 connection and N3 connection for the UE in the CM-IDLE state.

In the CM-IDLE state, if the UE is not in a MICO mode, the UE responds to paging (upon the reception) by performing a service request procedure. Or, when the UE has uplink signaling or user data to be transmitted, the UE performs the service request procedure. Or, the UE enter a CM-CONNECTED state whenever the AN signaling connection is established between the UE and the AN. Or, the transmission of an initial NAS message (registration request, service request, or deregistration request) initiates the transition from the CM-IDLE state to the CM-CONNECTED state.

In the CM-IDLE state, when the AMF has signaling or mobile-terminated data to be transmitted to the UE if the UE is not in the MICO mode, the AMF performs a network triggered service request procedure by transmitting a paging request to the corresponding UE. The AMF enter the CM-CONNECTED state whenever the N2 connection is established for the corresponding UE between the AN and the AMF.

The UE in the CM-CONNECTED state has the NAS signaling connection with the AMF over N1.

In the CM-CONNECTED state, the UE enters the CM-IDLE state whenever the AN signaling connection is released.

In the CM-CONNECTED state, the AMF enters the CM-IDLE state whenever N2 signaling connection and N3 signaling connection for the UE are released.

When a NAS signaling procedure is completed, the AMF may decide to release the NAS signaling connection of the UE. When the NAS signaling connection release is completed, the CM state in the UE is changed to the CM-IDLE state. When a N2 context release procedure is completed, the CM state for the UE in the AMF is changed to the CM-IDLE state.

The AMF can keep the UE in the CM-CONNECTED state until the UE de-registers from the core network.

The UE in the CM-CONNECTED state may be in a RRC inactive state. When the UE is in the RRC inactive state, UE reachability is managed by RAN using assistance information from the core network. When the UE is in the RRC inactive state, UE paging is managed by the RAN. When the UE is in the RRC inactive state, the UE monitors the paging using UE's CN and RAN identifier.

The RRC inactive state is applied to the NG-RAN (i.e., applied to NR and E-UTRA connected to 5G CN).

The AMF, based on network configuration, provides assistance information to the NG-RAN in order to assist the NG-RAN's decision about whether the UE transitions to the RRC Inactive state.

The RRC inactive assistance information includes a UE specific discontinuous reception (DRX) value for RAN paging in the RRC inactive state and a registration area provided to the UE.

CN assistance information is provided to a serving NG RAN node during N2 activation (i.e., during registration, service request, and path switching).

The states of the N2 and N3 reference points are not changed by the UE that enters the CM-CONNECTED state with RRC inactive. The UE in the RRC inactive state is aware of a RAN notification area.

When the UE is in the CM-CONNECTED state with the RRC inactive, the UE can resume RRC connection due to uplink data pending, a mobile initiated signaling procedure (i.e., periodic registration update), a response to RAN paging, or notifying the network that the UE has left the RAN notification area.

If the UE resumes the connection at different NG-RAN nodes within the same PLMN, the UE AS context is retrieved from an old NG-RAN node and a procedure is triggered toward the CN.

When the UE is in the CM-CONNECTED state with the RRC inactive, the UE performs cell selection to GERAN/UTRAN/EPS and follows an idle mode procedure.

The UE in the CM-CONNECTED state with the RRC inactive enters a CM-IDLE mode and follows the NAS procedure associated with the following cases.

If a RRC resume procedure fails,

If a movement of the UE to the CM-IDLE mode is required in a fail scenario that cannot be solved in the RRC inactive mode, The NAS signaling connection management includes functions of establishing and releasing the NAS signaling connection.

The NAS signaling connection establishment function is provided by the UE and the AMF to establish the NAS signaling connection of the UE in the CM-IDLE state.

When the UE in the CM-IDLE state needs to send the NAS message, the UE initiates a service request or a registration procedure to establish signaling connection to the AMF.

Based on UE preference, UE subscription information, UE mobility pattern, and network configuration, the AMF can keep the NAS signaling connection until the UE de-registers from the network.

A procedure of the release of the NAS signaling connection is initiated by a 5G (R)AN node or the AMF.

If the UE detects that the AN signaling connection is released, the UE decides that the NAS signaling connection has been released. If the AMF detects that the N2 context has been released, the AMF decides that the NAS signaling connection has been released.

3) UE Mobility Restriction

Mobility restriction restricts the service access or mobility control of the UE in the 5G system. A mobility restriction function is provided by the UE, the RAN, and the core network.

The mobility restriction is applied to only the 3GPP access and is not applied to the non-3GPP access.

The mobility restriction in the CM-IDLE state and the CM-CONNECTED state with the RRC inactive is performed by the UE based on information received from the core network. The mobility restriction in the CM-CONNECTED state is performed by the RAN and the core network.

In the CM-CONNECTED state, the core network provides the RAN with a handover restriction list for the mobility restriction.

The mobility restriction includes RAT restriction, a forbidden area, and service area restriction as follow:

RAT restriction: RAT restriction is defined as 3GPP RAT(s) to which the access of the UE is not allowed. The UE in the restricted RAT is not allowed to initiate any communication with the network based on subscription information.

Forbidden area: in a forbidden area under predetermined RAT, the UE is not allowed to initiate any communication with the network based on subscription information.

Service area restriction: the UE defines an area that can initiate or cannot initiate communication with the network as follows:

Allowed area: in an allowed area under predetermined RAT, the UE is allowed to initiate communication with the network if allowable by subscription information.

Non-allowed area: in a non-allowed area under predetermined RAT, the service area of the UE is restricted based on subscription information. The UE and the network are not allowed to initiate session management signaling (in both the CM-IDLE state and the CM-CONNECTED state) acquiring service request or user services. The RM procedure of the UE is the same as that in the allowed area. The UE in the non-allowed area responds to the paging of the core network with service request.

In a predetermined UE, the core network determines the service area restriction based on UE subscription information. Optionally, the allowed area may be fine-tuned by the PCF (based on, for example, UE location, permanent equipment identifier (PEI), network policies, etc.). The service area restriction may be changed due to, for example, changes in the subscription information, the location, the PEI and/or the polices. The service area restriction can be updated during the registration procedure.

If the UE has the RAT restriction, the forbidden area, the allowed area, the non-allowed area, or an overlap area in a combination thereof, the UE proceeds according to the following priority:

An evaluation of the RAT restriction takes precedence over an evaluation of any other mobility restriction;

An evaluation of the forbidden area takes precedence over an evaluation of the allowed area and the non-allowed area; and An evaluation of the non-allowed area takes precedence over an evaluation of the allowed area.

4) Mobile Initiated Connection Only (MICO) Mode

The UE may indicate a preference of an MICO mode during initial registration or registration update. The AMF determines whether the MICO mode is allowed to the UE based on local configuration, preference indicated by the UE, UE subscription information, network policies, or a combination thereof, and informs the UE of it during a registration procedure.

The UE and the core network re-initiate or exit the MICO mode in the following registration signaling. If the MICO mode is not explicitly indicated in the registration procedure and the registration procedure is successfully completed, the UE and the AMF do not use the MICO mode. Namely, the UE operates as a general UE, and the network also treats the corresponding UE as a general UE.

The AMF allocates the registration area to the UE during the registration procedure. If the AMF indicates the MICO mode to the UE, the registration area is not limited to a size of a paging area. If an AMF serving area is the whole PLMN, the AMF may provide the UE with the "whole PLMN" registration area. In this case, re-registration to the same PLMN due to the mobility does not apply. If the mobility restriction is applied to the UE of the MICO mode, the AMF allocates the allowed area/non-allowed area to the UE.

If the AMF indicates the MICO mode to the UE, the AMF regards the UE as being always unreachable while the UE is in the CM-IDLE state. The AMF rejects any request for downlink data transfer to the corresponding UE that is in the MICO mode and in the CM-IDLE state. The AMF also defers downlink transport such as SMS and location services over NAS. The UE in the MICO mode is reachable for mobile terminated data or signaling only when the UE is in the CM-CONNECTED mode.

When the UE in the MICO mode transitions to the CM-CONNECTED mode, the AMF can provide pending data indication to a RAN node to be able to immediately transfer mobile terminated data and/or signaling. If the RAN node receives this indication, the RAN node considers this information when determining user inactivity.

The UE in the MICO mode does not need to listen to paging while the UE is in the CM-IDLE state. The UE in the MICO mode can stop any AS procedure in the CM-IDLE state due to one of the following reasons until the UE initiates the transition from the CM-IDLE mode to the CM-CONNECTED mode:

if change in the UE (e.g. change in configuration) requires an update of the registration with the network if a periodic registration timer expires if MO data pending if MO signaling pending Quality of Service (QoS) Model QoS is a technology for delivering smoothly services to the user according to properties of each of various traffics (e.g., mail, data transfer, voice, and video).

A 5G QoS model supports a QoS flow based framework. The 5G QoS model supports both QoS flows requiring a guaranteed flow bit rate (GFBR) and QoS flows not requiring the GFBR.

The QoS flow is the finest granularity of QoS differentiation in a PDU session.

A QoS flow ID (QFI) is used to identify a QoS flow in the 5G system. The QFI is unique within the PDU session. A user plane traffic with the same QFI within the PDU session receives the same traffic forwarding treatment (e.g., scheduling, admission threshold, etc.). The QFI is delivered within an encapsulation header on N3 (and N9). The QFI may be applied to PDUs (i.e., IP packets, unstructured packets, and Ethernet frames) with different types of payload.

i) Each QoS flow (guaranteed bit rate (GBR) and non-guaranteed bit rate (non-GBR)) is associated with the following QoS parameters.

5G QoS Indicator (5QI): The 5QI is a scalar that is used as a reference to 5G QoS characteristics (i.e., access node-specific parameters, for example, scheduling weights, admission thresholds, queue management thresholds, link layer protocol configuration, etc., that control QoS forwarding treatment for the QoS flow).

Allocation and Retention Priority (ARP): The ARP includes a priority level, pre-emption capability, and pre-emption vulnerability. The priority level defines the relative importance of a resource request. This is used to determine whether a new QoS flow may be accepted or needs to be rejected in case of resource limitations, and also used to determine whether an existing QoS flow pre-empts resources during resource limitations.

ii) Each GBR QoS flow is additionally associated with the following QoS parameters.

GFBR

Uplink and downlink;

Maximum Flow Bit Rate (MFBR)—uplink and downlink;

Notification control.

Two methods for controlling the following QoS flow are supported:

i) Non-GBR QoS flow with 5QI: A standardized 5QI is used as the QFI, and a normal ARP is used. In this case, when a traffic for a corresponding QoS flow starts, additional N2 signaling is not required.

ii) GBR and non-GBR QoS flows: Upon establishment of the PDU session to the QFI or establishment/modification of QoS flow, all of corresponding necessary QoS parameters, as QoS profiles, are transmitted to (R)AN and UPF.

Figure 12:
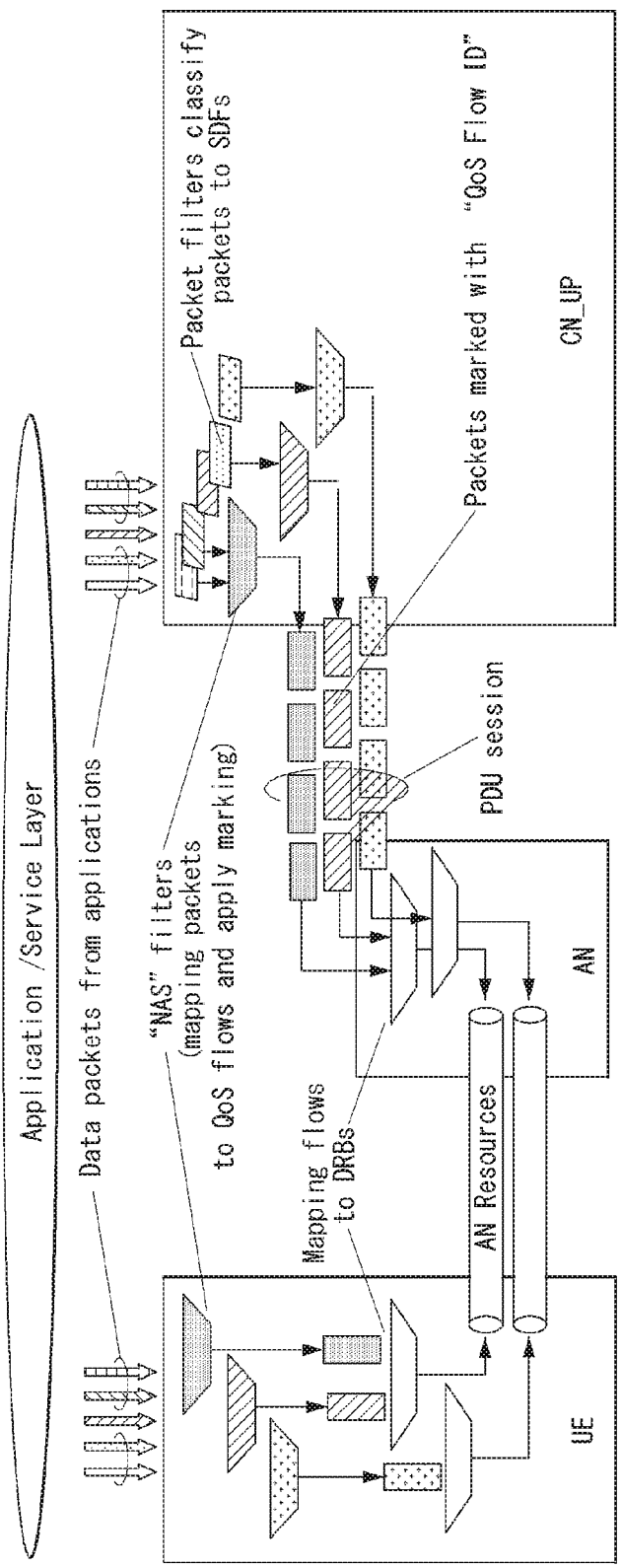
FIG. 12 illustrates classification and user plane marking for QoS flow and mapping of QoS flow to AN resources according to an embodiment of the present invention.

FIG. 12 illustrates classification and user plane marking for QoS flow and mapping of QoS flow to AN resources according to an embodiment of the present invention.

1) Downlink

The SMF allocates the QFI for every QoS flow. The SMF derives its QoS parameters from information provided by the PCF.

The SMF provides the (R)AN with the QFI together with a QoS profile including the QoS parameters of the QoS flow. When the PDU session or the QoS flow is established, the QoS parameters of the QoS flow, as the QoS profile, are provided to the (R)AN over N2. Further, each time NG-RAN is used, the user plane is activated. For the non-GBR QoS flow, the QoS parameters may be previously configured.

The SMF provides the UPF with a SDF template (i.e., a set of packet filters associated with a SDF received from a PCF) together with SDF precedence and the corresponding QFI, so that the UPF can perform classification and marking of downlink user plane packets.

Downlink incoming data packets are classified based on the SDF template according to the SDF precedence (without the initiation of additional N4 signaling). A CN classifies user plane traffics belonging to the QoS flow through N3 (and N9) user plane marking using the QFI. The AN binds the QoS flow to AN resources (i.e., DRB in case of 3GPP RAN). In this instance, a relation between the QoS flow and the AN resources is not limited to one-to-one correspondence.

2) Uplink

The SMF allocates a QoS rule identifier, adds a QFI of QoS flow, sets packet filter(s) to an uplink part of a SDF template, and sets QoS rule precedence to SDF precedence, thereby creating QoS rule(s) for PDU session. The SMF can provide the QoS rules to the UE so that the UE can perform classification and making.

The QoS rule includes a QoS rule identifier, the QFI of the QoS flow, one or more packet filters, and a precedence value. The same QFI (i.e., the same QoS flow) and one or more QoS rules may be associated.

A basic QoS rule is required for every PDU session. The basic QoS rule is a QoS rule of PDU session not including the packet filter (in this case, a highest precedence value (i.e., a lowest priority) is used). If the basic QoS rule does not include the packet filter, the basic QoS rule defines processing of a packet not matching with any QoS rule in the PDU session.

The UE performs classification and making of uplink user plane traffic. That is, the UE associates the uplink traffic with the QoS flow based on the QoS rule. This rule may be explicitly signaled over N1 (at the PDU session establishment or at the QoS flow establishment), or previously configured in the UE, or implicitly derived by the UE from reflective QoS.

In the UL, the UE evaluates a UL packet for the packet filter of the QoS rule based on a precedence value of the QoS rule (i.e., in increasing order of the precedence value) until the matching QoS rule (i.e., the packet filter matches with the UL packet) is found. The UE binds the UL packet to the QoS flow using the QFI in the corresponding matching QoS rule. The UE binds the QoS flow to AN resources.

Method for Signaling/Transmitting Preference Resource Information of UE

In a related art, a method representing a resource usage preference of a UE (or a user of the UE) for direct communication system operation and mobility management was present as follows.

1) Power Preference Indicator (PPI): it is an indicator used for the UE to inform an eNB of its power preference via a RRC message and may be configured and transmitted as a normal power or a low power. The PPI is an indicator that is currently (during a network node) used only in the eNB, and may be used to adjust a pause period of the UE by adjusting DRX. However, how the PPI is concretely applied depends on the implementation of the network.

2) Bearer Resource Modification Request Procedure of UE

When there is no bearer for which a proper QoS for providing services for the UE is configured, the UE may request it directly to the network.

3) Operation Mode of UE

The UE may indicate to a core network whether a service preferred by the UE is voice centric or data centric, and the core network may select/control RAT (e.g., E-UTRAN, UTRAN, and/or GERAN, etc.), on which the UE is camped, using service preference information of the UE. For example, when the core network receiving, from the UE, an indication that the UE prefers a voice centric service decides that it is difficult to provide a voice service in the E-UTRAN on which the UE is camped, the core network may move a camping RAT of the UE to another RAT serving CS, such as UTRAN/GERAN.

Power preference information of the UE such as the PPI defined in the related art is transmitted only to the eNB and is applied to an IoT type terminal, and its utilization is limited to the adjustment of a DRX cycle. In case of a bearer resource modification request procedure of the UE, it is limited to a request for a specific application service. Further, in case of an operation mode of the UE according to voice/data centric service, it is such that the RAT on which the UE will be camped is properly selected according to service preference information of the UE.

A 5G/NextGen system, as described above, may support various vertical services as well as slice concept. The 5G/NextGen system may provide services in an on-demand scheme under various mobility levels and service continuity within a wide range of each vertical service.

More specifically, in case of the UE with high-speed mobility, an abundant resource input to the RAN/CN as well as the UE is required to maintain a highest performance. For example, the DRX cycle of the UE has to be denser, and processes at the UE have to more increase for a highest throughput. Further, not only a measurement reporting at the UE but also physical resource input such as retransmission and coverage enhancement for QoS of the same level may be more required (than a legacy system) to ensure seamless mobility and support handover.

Even during such a high-speed movement of the UE, some users may want to receive the best service by using resources (which may be battery power for processing from the point of view of the UE) as much as possible even if the battery consumption is large. On the other hand, some users may want receive minimal service by using resources as less as possible to minimize the battery consumption.

In particular, in case of enhanced Mobile Broadband (eMBB), the 5G/NextGen system can provide performances of different levels for the same service due to a feature that mobility and continuity of different levels can be supported. As a result, a trade-off relationship may be established regarding whether the performance is more important or the resource saving is more important in the service, the UE and/or the network.

For example, even if user's subscription information is configured to be able to provide the highest performance to the UE, an eMBB user may not always want to receive the service of the highest performance to conserve the power and the resources.

For example, in high-speed vehicles (e.g., high-speed rail, subway, etc.), the UE has to waste more power and resources in order to meet a performance of a level similar to a normal speed. In this instance, in a situation where a battery of the UE is insufficient, the user may want to save energy to maximize an operation time of the UE. Alternatively, other user may want the UE to provide a maximum performance even in the situation of the insufficient battery.

Accordingly, the following method is proposed to deliver in real time a resource usage/operation scheme of the UE preferred by the user to the 5G/NextGen system and manage and configure, by the 5G/NextGen system receiving the scheme, parameters/resources related to the scheme in consideration of the UE's preference.

More specifically, a method is proposed to directly inform, by the UE, the 5G/NextGen system of whether the user prioritizes a performance (i.e., performance centric) (than the battery/resource saving) or prioritizes the battery/resource saving (i.e., energy centric) (than the performance), in addition to the above-described preference information of the UE. In this case, a method is proposed to actively reflect the preference of the UE upon various operations of 5G/NextGen, so that the 5G/NextGen system can configure/set resources optimized for the preference requested by the UE.

Hereinafter, as a kind of resource preference information of the UE, a performance centric that prioritizes the performance and an energy centric that prioritizes the resource/energy saving are defined. In this case, if the user selects/configures (manually) one of the above two, the UE may transmit the selected resource preference information to the CN, optimize the entire 5G/NextGen system according to a scheme preferred by the user/resource preference information (e.g., performance centric or energy centric) received from the UE, and serve the corresponding UE. More specifically, the CN may select appropriate resources (e.g., DRX cycle, slice, session setup time, QoS level, CQI reporting period, etc.) to be allocated to the UE based on the resource preference information received from the UE.

A more detailed embodiment related to this will be described below with reference to FIGS. 13 and 14.

Figure 13:
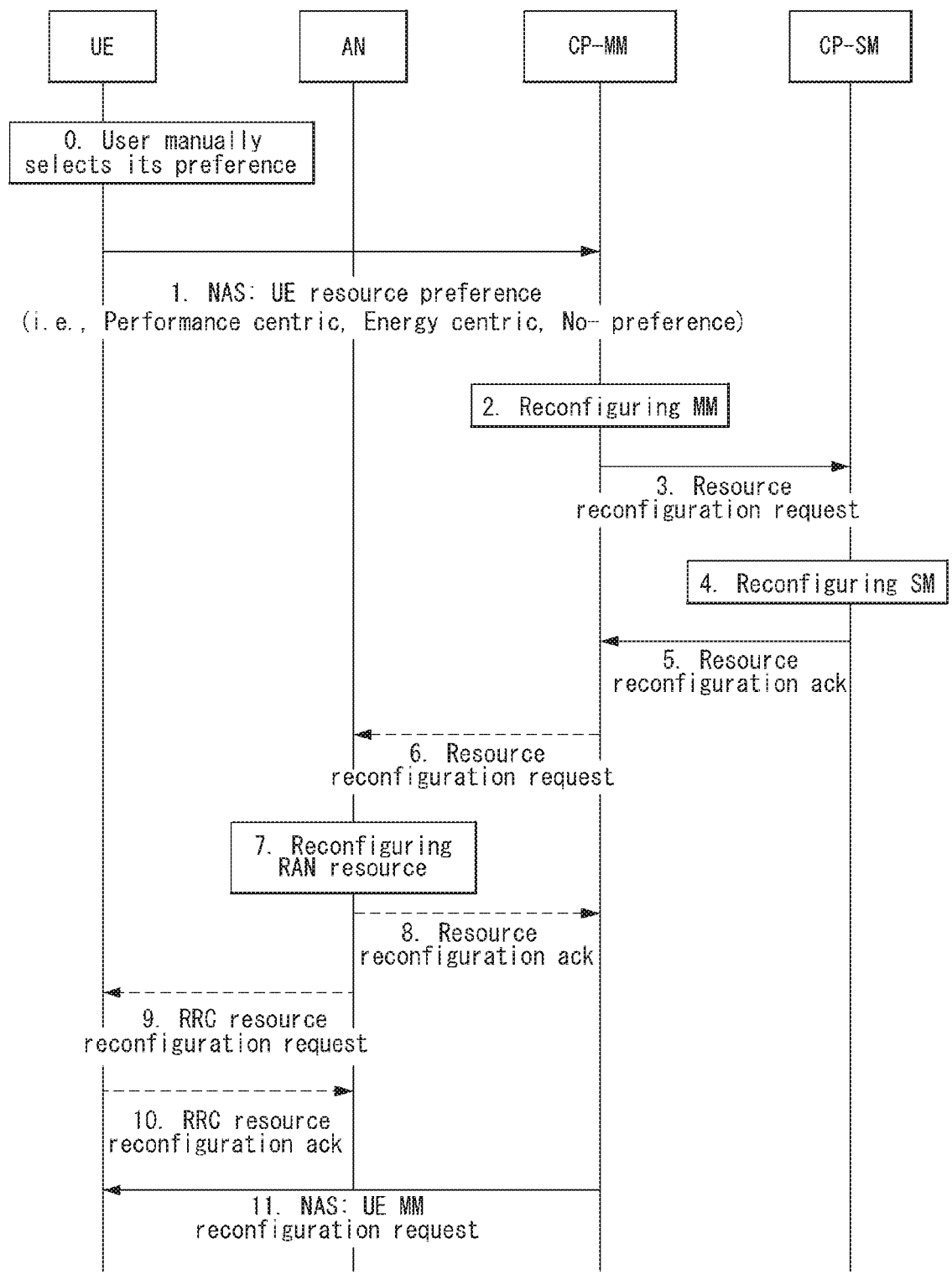
FIG. 13 is a flow chart illustrating a method for transmitting, by a UE, information about resources preferred by the UE to a network node in accordance with an embodiment of the present invention.

FIG. 13 is a flow chart illustrating a method for transmitting, by a UE, information about resources preferred by the UE to a network node in accordance with an embodiment of the present invention. In the flow chart, at least one step may be excluded according to the embodiment, and a new step may be added. In particular, the step indicated by the arrows in the flow chart may be selectively performed according to the embodiment.

0. A user may configure/select an operation mode of the UE preferred by the user. Here, the UE operation mode, as described above, may include a performance centric mode that prioritizes the performance, an energy centric mode that prioritizes the resource/energy saving, and/or a default mode (or no-preference mode). In a case where the default mode (or no-preference mode) is configured, the CN may recognize the case as the UE has not sent any preference information, and the 5G/NextGen system may set/configure the most appropriate resources to the UE in consideration of both the performance and the resource usage per individual slice/service in the default mode (or no-preference mode).

Alternatively, although not shown in the flow chart, the UE may receive an operation mode directly from the user as described above, but may configure UE preference information by configuring an operation mode by itself without a user input according to a current operation state (e.g., a battery status of the UE and/or running applications) of the UE. For example, the UE may configure the performance centric mode when a current remaining battery level exceeds a threshold, and configure the energy centric mode when the current remaining battery level is the threshold or less. Alternatively, the UE may configure the performance centric mode when the UE runs an application (e.g., video play, etc.) requiring a high performance, and configure the energy centric mode when the UE runs an application (e.g., SMS transmission) requiring a low performance.

1. The UE may generate/configure UE resource preference information indicating a configured operation mode and transmit it to the 5G/NextGen system. More specifically, the UE may generate resource preference information (i.e., performance centric, energy centric, or no-preference) preferred by the UE according to the configured operation mode and transmit it to CP-MM (NextGen Mobility Management Function) (or AMF) via a NAS message. The resource preference information may be continuously stored in 5G/NextGen CN (e.g., CP-MM or AMF) until a separate update request by the UE occurs, and may be changed by the update request by the UE. However, resource preference information of the corresponding UE may be initialized through connection detach, etc. and may have the same value as the default mode (or no-preference mode).

2. The CP (Control Plane)-MM (or AMF) may (re)constitute/(re)configure resources for a mobility management operation of the UE based on the received resource preference information. For example, the CP-MM (or AMF) may (re)constitute/(re)configure whether a DRX cycle and/or a power saving mode (PSM) is applied based on the received resource preference information. Here, the power saving mode defines a period in which the UE disables all of access stratum (AS) operations such as paging reception and mobility management, and functions to minimize power consumption of the UE. That is, the UE supporting the PSM agrees (or is provided with) an active time and a periodic tracking area update (TAU) (P-TAU) timer with (or from) the network upon attach and TAU.

If the received resource preference information indicates the performance centric, the CP-MM (or AMF) may configure the DRX cycle to be short and/or may not apply the power saving mode. Alternatively, if the received resource preference information indicates the energy centric, the CP-MM (or AMF) may configure the DRX cycle to be long and/or may apply the power saving mode. Alternatively, if the received resource preference information indicates the default (or no-preference), the CP-MM (or AMF) may apply the DRX cycle and/or the power saving mode in consideration of both the performance and the energy.

In particular, the CP-MM (or AMF) may (re)constitute/(re)configure resources for the UE so that it can support the best UE performance in the case of the performance centric in consideration of a slice and/or a service to which the UE belongings, or can satisfy energy efficiency while supporting only a minimum UE performance considering a slice and/or a service in the case of the energy centric.

3. The CP-MM (or AMF) may deliver resource preference information of the UE to a CP (Control Plane)-SM (NextGen Session Management Function) (or SMF) serving the corresponding UE (i.e., the UE transmitting the resource preference information) via a resource (re)configuration request message.

4. The CP-SM (or SMF) may (re)constitute/(re)configure resources in consideration of a slice and/or a service with which the UE is served. More specifically, when the resource preference information indicates the performance centric, the CP-SM (or SMF) may (re)constitute/(re)configure resources so that it supports the best UE performance (e.g., providing the seamless continuity and/or providing the best QoS level). Further, when the resource preference information indicates the energy centric, the CP-SM (or SMF) may (re)constitute/(re)configure resources so that it supports only the minimum UE performance.

5. The CP-SM (or SMF) may transmit a resource (re)configuration Ack message (in response to a resource (re)configuration request message received from the CP-MM (or AMF). In this instance, when there is change in information/value of the resource (re)configuration Ack message affecting the CP-MM (or AMF) as the CP-SM (or SMF) (re)constitutes/(re)configures the resources, the CP-SM (or SMF) may transmit it to the CP-MM (or AMF).

6 to 8. The CP-MM (or AMF) may transmit resource preference information of the UE to an access node (AN) (or eNB) serving the UE. This can be implemented by requesting the AN (or eNB) to change QoS update or a specific parameter used by the UE. Alternatively, the CP-MM (or AMF) may transmit, to the AN (or eNB), a RAN resource (re)configuration message simply including the resource preference information of the UE, and may allow the AN (or eNB) to reflect it. The AN (or eNB) may (re)constitute/(re)configure resources based on the received resource preference information. If the AN (or eNB) receives the resource preference information via the RAN resource (re)configuration message, the AN (or eNB) may transmit a resource (re)configuration Ack message to the CP-MM (or AMF) in response to it.

9 and 10. The AN (or eNB) may inform the UE of configuration change at PDCP or RLC/MAC (via a RRC resource (re)configuration request message). The UE may transmit a RRC resource (re)configuration Ack message to the AN (or eNB) in response to it.

11. When change in parameter/information for the UE is generated/requested in relation to the resource (re)configuration, the CP-MM (or AMF) may transmit a UE MM reconfiguration request message for informing the UE of it. In this instance, the UE MM reconfiguration request message may be implemented as a NAS message.

That is, if the UE indicates "performance centric" according to the present flow chart, the NextGen system may reconfigure MM, SM and RAN resource usages to provide the best performance in relation to the slice and the service of the UE based on an operator policy.

Further, if the UE indicates "energy centric", the NextGen system may reconfigure MM, SM and RAN resource usages to maximize the battery efficiency. However, even in this case, a minimum requirement of service regarding a slice of the UE according to the operator policy has to be still met.

If the UE indicates the default (or no-preference), the 5G/NextGen system has to configure the resource usage balanced/adjusted between the performance and the energy efficiency.

The following Table 2 illustrates resource (re)configuration/(re)constitution at the network node according to resource preference information of the UE.

TABLE 2

| UE preference | MM | SM | RAN |
|---|---|---|---|
| Performance centric | Reachability handling (short DRX or always connected) | Session pre-setup (Handover) QoS (highest level per service) | CQI reporting period (frequent) |
| Energy centric | Reachability handling (longer DRX) | Session post-setup (cell reselection) QoS (meet only minimum requirement per service) | CQI reporting period (infrequent) |

Referring to Table 2, each network node (e.g., MM (or AMF), SM (or SMF), and (R)AN (or eNB)) receiving the resource preference information of the UE may (re)configure/(re)constitute resources for the UE in consideration of the received resource preference information.

More specifically, when the resource preference information indicates the performance centric,
the MM (or AMF) may handle reachability with a short DRX cycle or an always connected state,
the SM (or SMF) may select a session pre-setup (i.e., always-on PDU session) scheme for previously (e.g., before the connection of the UE) setting up (thus, performing handover) a session, and/or may apply a highest QoS level per service/slice, and/or
the (R)AN (or eNB) may configure a CQI reporting period to a 'frequent' (or short) reporting period.

Alternatively, when the resource preference information indicates the performance centric,
the MM (or AMF) may handle reachability with a long DRX cycle,
the SM (or SMF) may select a session post-setup (i.e., on-demand PDU session) scheme for post (e.g., after the connection of the UE) setting up (i.e., performing cell reselection) a session, and/or may apply a QoS level capable of meeting minimum requirement per service/slice, and/or
the (R)AN (or eNB) may configure a CQI reporting period to an 'infrequent' (or long) reporting period.

Here, the session pre-setup (i.e., always-on PDU session) scheme is a manner that makes PDU session for the corresponding UE upon attach (i.e., upon initial registration) of the UE and then continuously maintains the PDU session even when it is not used by the UE for a predetermined time (or long time), and ensures IP continuity of the UP.

Further, the session post-setup (i.e., on-demand PDU session) scheme, as described above, is a manner that makes PDU session for the UE and then releases the corresponding PDU session by the network node when it is not used by the UE for a predetermined time. Thus, in this case, the UE does not need to handle the corresponding PDU session when performing handover.

Further, although not illustrated in Table 2, from the point of view of the 5G/NextGen system, an inactivity timer used in the AN (or eNB) may also be configured based on resource preference information of the UE. Here, the inactivity timer is referred to as a timer used to trigger UE context release by the AN (or eNB).

That is, when the UE indicates "energy centric", the AN (or eNB) may configure short the inactivity timer and release RRC connection of the UE as soon as possible. However, when the UE indicates "performance centric", the AN (or eNB) may configure long the inactivity timer and leave the UE in a RRC-connection state as long as possible, thereby reducing a delay.

Further, although not illustrated in Table 2, from the point of view of the 5G/NextGen system, the network node (e.g., MM (or AMF) and (R)AN (or eNB)) may change a slice (or slice instance) of the UE to a slice (or slice instance) optimized for resource preference information received from the corresponding UE and may inform the UE of it. In this instance, the network node may inform the UE of the changed slice (or slice instance) by transmitting S-NSSAI corresponding to the changed slice (or slice instance) to the UE. That is, the network node (e.g., MM (or AMF) and (R)AN (or eNB)) may select/map a slice (or slice instance) optimized for resource preference information of the UE among a plurality of slices (or a plurality of slice instances) allowed/configured for the UE and may inform the UE of it. In this instance, the network node may inform the UE of the changed slice (or slice instance) by transmitting the S-NSSAI of the changed slice (or slice instance) to the UE.

Here, the S-NSSAI may identify a slice for individual service, and a plurality of S-NSSAIs may be allocated to the UE. A union of the plurality of S-NSSAIs allocated to one UE may be NSSAI. The UE may receive a UE policy, and the UE policy may correspond to information about which application is mapped to a certain DNN and/or a certain S-NSSAI.

For example, when the UE is requested to transmit and receive data for a specific application, the UE may transmit, to the network node, a PDU session creation request message including a DNN and a S-NSSAI mapped to a corresponding application. Hence, the MM (or AMF) selects the SM (or SMF) which will support PDU session creation/management of the corresponding UE based on the received DNN and S-NSSAI. In this instance, the UE may include and transmit the above-described resource preference information in the PDU session creation request message, and the MM (or AMF) receiving this may additionally consider the corresponding information to select the SM (or SMF). For example, when resource preference information preferred by each SM (or SMF) is configured per SM (or SMF) (e.g., energy centric SM (or SMF) and performance centric SM (or SMF)), the MM (or AMF) may select SM (or SMF) matched to the resource preference information received from the UE as a SM (or SMF) for the corresponding UE.

If the PDU session has been already setup, the UE may transmit the resource preference information to the network node through a registration procedure, etc. In this instance, if resource preference information underlying the setup PDU session is different from resource preference information newly transmitted by the UE, the SM (or SMF) can setup again the PDU session via the SM (or SMF) (i.e., energy centric SM (or SMF) or performance centric SM (or SMF)) optimized/suitable for resource preference information through the PDU session release with re-establishment when the UE requests the release of the PDU session and a new PDU session or the MM (or AMF) transmits the resource preference information received from the UE to the SM (or SMF).

In addition, if there are different MMs (or AMFs) (e.g., energy centric MM (or AMF) or performance centric MM (or AMF)) according to resource preference information preferred by itself, the MM (or AMF) may change the MM (or AMF) of the corresponding UE to the MM (or AMF) matched to resource preference information of the UE received through a re-routing procedure (or registration procedure with AMF relocation) when the MM (or AMF) receives resource preference information configured for itself from the UE and resource preference information of another UE.

According to the present embodiment, the UE can dynamically express/display its resource usage environment configuration (e.g., performance centric, energy centric, or no-preference) on the 5G/NextGen system. Hence, the 5G/NextGen system can reflect the user's preference in resource configuration/operation of the MM (or AMF), the SM (or SMF), and the (R)AN (or eNB).

According to the present embodiment, since the network node receives, from the UE, information on the resource operation method preferred by the user/UE and selects resources, there is an effect of a reduction in the burden on the network node which has to select the most appropriate resources for providing services to the UE in the 5G/NextGen system that operates wide resources. Further, there is an effect that the operation of resources of the 5G/NextGen system optimized for UE's current situation and/or user's preference is possible.

Figure 14:
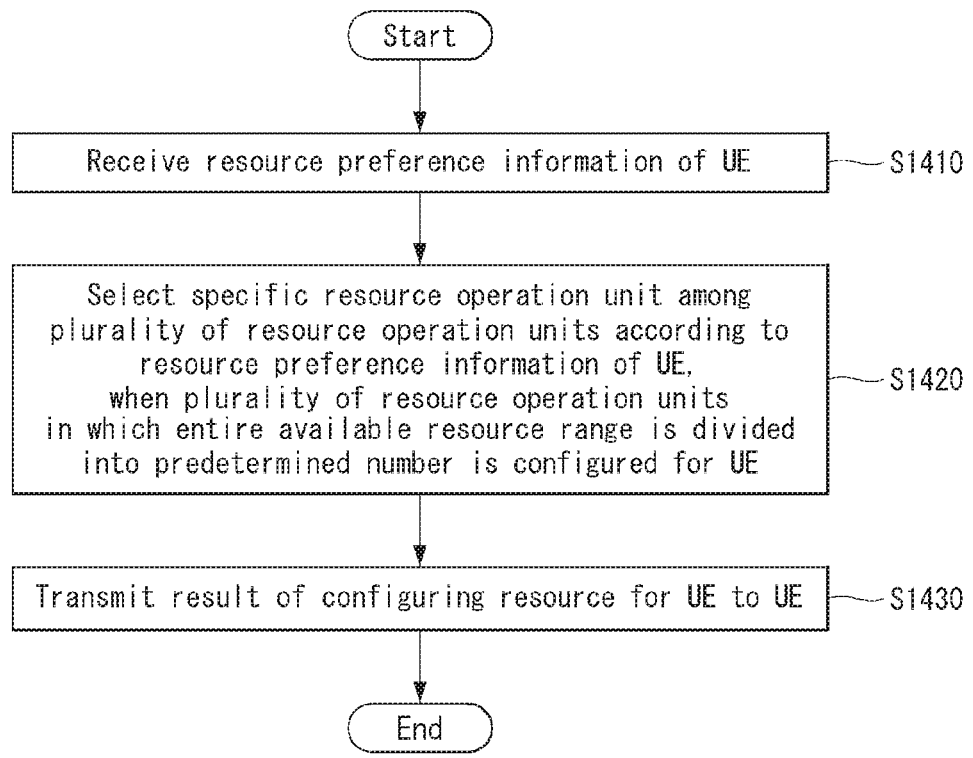
FIG. 14 is a flow chart illustrating a method for configuring UE resources of a network node according to an embodiment of the present invention.

FIG. 14 is a flow chart illustrating a method for configuring UE resources of a network node according to an embodiment of the present invention. The description of the above-described embodiments may be equally/similarly applied to the present flow chart, and duplicate description is omitted below.

First, a network node may receive resource preference information of a UE in S1410. In this instance, the network node may correspond to a MM (or AMF) for managing a mobility of the UE, a SM (or SMF) for managing a session of the UE, or an (R)AN (or eNB) for serving the UE. In particular, the MM (or AMF) may directly receive resource preference information of the UE from the UE via a NAS message and may transmit it to other network (e.g., SM (or SMF) or (R)AN (or eNB)). The resource preference information is network assistance information for indicating a resource operation scheme preferred by the UE, and may be configured to indicate a performance centric representing a preference for a resource operation that prioritizes a performance of the UE, or an energy centric representing a preference for a resource operation that prioritizes resource saving of the UE.

Next, the network node may configure a resource for the UE based on the resource preference information in S1420. More specifically, when a plurality of resource operation units in which an entire available resource range is divided into a predetermined number is configured for the UE, the network node may select a specific resource operation unit among the plurality of resource operation units according to the resource preference information of the UE. In this instance, the network node may configure the resource for the UE in consideration of a slice and/or a service of the UE in addition to the resource preference information.

For example, when the resource preference information indicates the performance centric, the network node may select a DRX cycle for the UE as a short cycle or an always-connected state to which the DRX cycle is not applied, and when the resource preference information indicates the energy centric, the network node may select the DRX cycle for the UE as a long cycle.

And/or, for example, when the resource preference information indicates the performance centric, the network node may not apply a power saving mode to the UE, and when the resource preference information indicates the energy centric, the network node may apply the power saving mode to the UE.

And/or, for example, when the resource preference information indicates the performance centric, the network node may select an always-on PDU session scheme that maintains the session for the UE regardless of whether the session is used by the UE, and when the resource preference information indicates the energy centric, the network node may select an on-demand PDU session scheme that releases the session when the session is not used by the UE for a predetermined time.

And/or, for example, when the resource preference information indicates the performance centric, the network node may select a QoS level of a service for the UE as a highest level, and when the resource preference information indicates the energy centric, the network node may select the QoS level as a level that satisfies a minimum requirement required to provide the service for the UE.

And/or, for example, when the resource preference information indicates the performance centric, the network node may select a CQI reporting period of the UE as a period shorter than a predetermined reporting period, and when the resource preference information indicates the energy centric, the network node may select the CQI reporting period as a period longer than the predetermined reporting period.

And/or, for example, the network node may change a slice for the UE to other slice based on the resource preference information, and may transmit NSSAI for the changed slice to the UE. For example, when resource preference information about a resource operation scheme preferred by the network node is different from the resource preference information of the UE received from the UE, the network node may change a serving network node of the UE to other network node matched to the resource preference information of the UE. That is, when resource preference information preferred by the serving network node of the UE is different from the resource preference information of the UE, the serving network node of the UE may be changed to a network node (e.g., energy centric network node (e.g., energy centric MM (or AMF) and energy centric SM (or SMF)), or performance centric network node (e.g., performance centric MM (or AMF) and performance centric SM (or SMF))) for which resource preference information matched to the resource preference information of the UE is configured based on the resource preference information of the UE.

Finally, the network node may transmit, to the UE, a result of configuring the resource for the UE in S1430. For example, when a configuration parameter of the UE has to be changed according to the result of configuring the resources for the UE, the network node may transmit a message requesting an update of the configuration parameter to the UE. And/or, when a configuration parameter of other network node has to be changed according to the result of configuring the resources for the UE, the network node may transmit a message requesting an update of the configuration parameter to at least one other network node.

Overview of Device to which the Present Invention is Applicable

Figure 15:
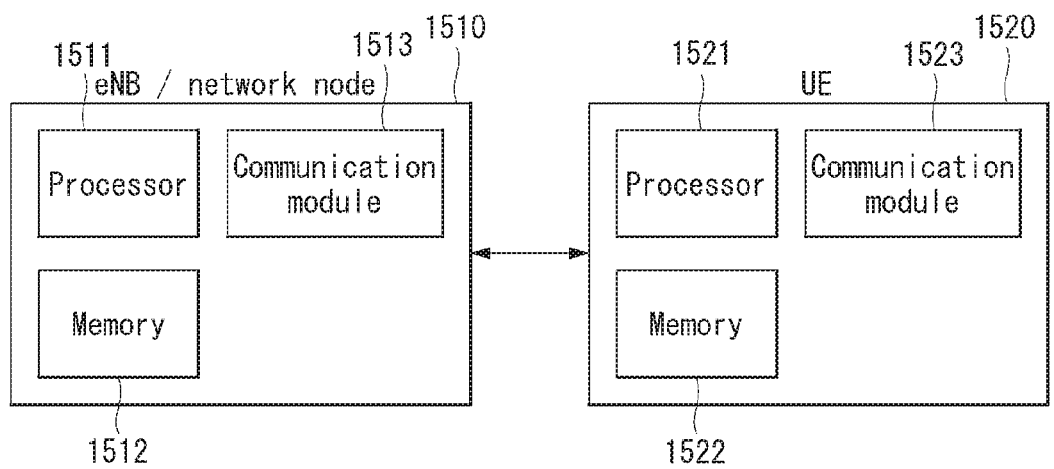
FIG. 15 illustrates a block configuration diagram of a communication device according to an embodiment of the present invention.

FIG. 15 illustrates a block configuration diagram of a communication device according to an embodiment of the present invention.

Referring to FIG. 15, a wireless communication system includes a network node 1510 and a plurality of UEs 1520. A device shown in the present drawing may be implemented to perform at least one of the above-described network/UE functions, and may be implemented to perform a combination of one or more functions.

The network node 1510 includes a processor 1511, a memory 1512, and a communication module 1513.

The processor 1511 implements at least one function, process, and method proposed in FIGS. 1 to 14 and/or functions, processes, and methods proposed in the present document. Further, the processor 1511 may be a module implementing functions, processes, and/or methods proposed in the present specification, and a program, etc. may be stored in the memory 1512 and may be implemented by the processor 1511.

Layers of wired/wireless interface protocol may be implemented by the processor 1511. Further, the processor 1511 may be implemented so that matters described in various embodiments proposed in the present document are independently applied, or two or more embodiments are simultaneously applied.

The memory 1512 is connected to the processor 1511 and stores various types of information for driving the processor 1511. The memory 1512 may be inside or outside the processor 1511 and may be connected to the processor 1511 through various well-known means.

The communication module 1513 is connected to the processor 1511 and transmits and/or receives wired/wireless signals. Examples of the network node 1510 include a base station, MME, HSS, SGW, PGW, SCEF, SCS/AS, AUSF, AMF, PCF, SMF, UDM, UPF, AF, (R)AN, UE, NEF, NRF, UDSF, and/or SDSF. In particular, when the network node 1510 is the base station (or when the network node 1510 is implemented to perform a function of the (R)AN), the communication module 1513 may include a radio frequency (RF) unit for transmitting/receiving a radio signal. In this instance, the network node 1510 may have a single antenna or multiple antennas.

The UE 1520 includes a processor 1521, a memory 1522, and a communication module (or RF unit) 1523. The processor 1521 implements at least one function, process, and method proposed in FIGS. 1 to 14 and/or functions, processes, and methods proposed in the present document. Further, the processor 1521 may be a module implementing functions, processes, and/or methods proposed in the present specification, and a program, etc. may be stored in the memory 1522 and may be implemented by the processor 1521.

The processor 1521 may implement layers of wired/wireless interface protocol. Further, the processor 1521 may be implemented so that matters described in various embodiments proposed in the present document are independently applied, or two or more embodiments are simultaneously applied.

The memory 1522 is connected to the processor 1521 and stores various types of information for driving the processor 1521. The memory 1522 may be inside or outside the processor 1521 and may be connected to the processor 1521 through various well-known means. The communication module 1523 is connected to the processor 1521 and transmits and/or receives wired/wireless signals.

The memories 1512 and 1522 may be inside or outside the processors 1511 and 1521 and may be connected to the processors 1511 and 1521 through various well-known means. Further, the network node 1510 (in case of the base station) and/or the UE 1520 may have a single antenna or multiple antennas.

Figure 16:
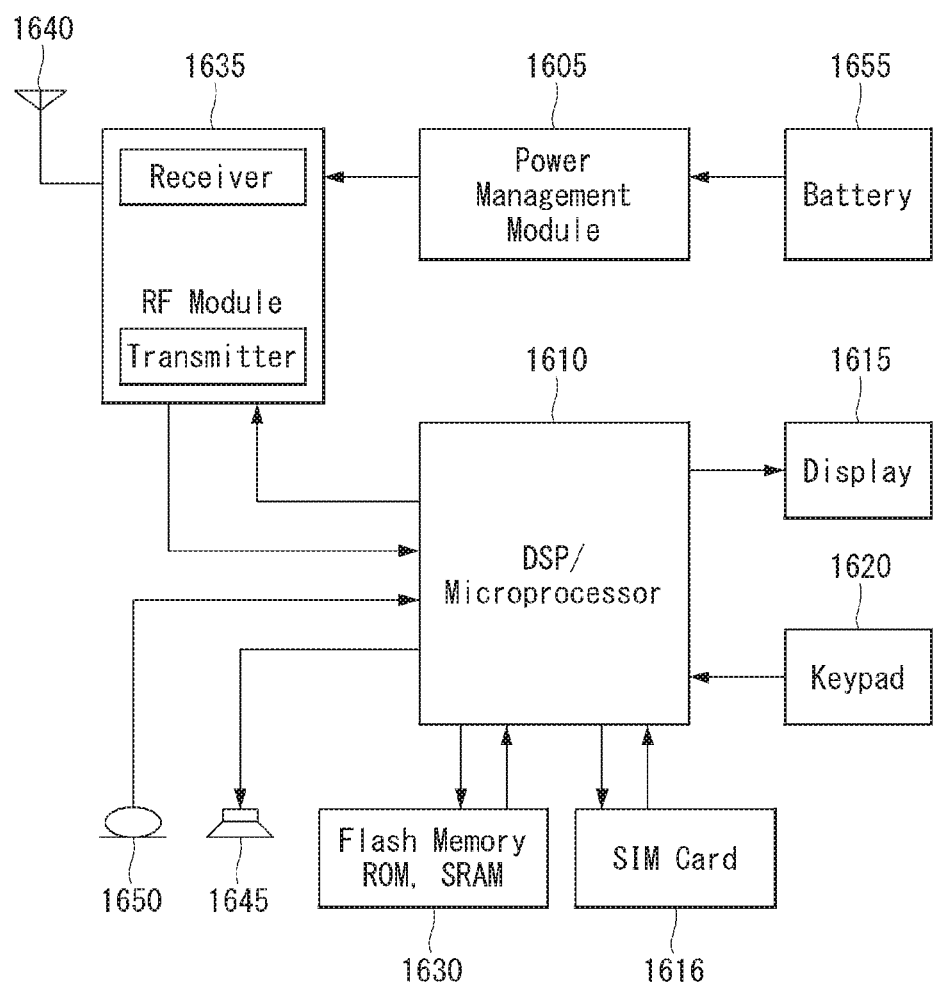
FIG. 16 illustrates a block configuration diagram of a communication device according to an embodiment of the present invention.

FIG. 16 illustrates a block configuration diagram of a communication device according to an embodiment of the present invention.

In particular, FIG. 16 illustrates the UE illustrated above FIG. 15 in more detail.

Referring to FIG. 16, the UE may include a processor (or digital signal processor (DSP)) 1310, an RF module (or RF unit) 1635, a power management module 1605, an antenna 1640, a battery 1655, a display 1615, a keypad 1620, a memory 1630, a subscriber identification module (SIM) card 1625 (which is optional), a speaker 1645, and a microphone 1650. The UE may include a single antenna or multiple antennas.

The processor 1610 implements functions, processes, and/or methods proposed in FIGS. 1 to 15. Layers of a wireless interface protocol may be implemented by the processor 1610.

The memory 1630 is connected to the processor 1610 and stores information related to operations of the processor 1610. The memory 1630 may be inside or outside the processor 1610 and may be connected to the processors 1610 through various well-known means.

A user inputs instructional information, such as a telephone number, for example, by pushing (or touching) buttons of the keypad 1620 or by voice activation using the microphone 1650. The microprocessor 1610 receives and processes the instructional information to perform an appropriate function, such as to dial the telephone number. Operational data may be extracted from the SIM card 1625 or the memory 1630. Further, the processor 1610 may display instructional information and operational information on the display 1615 for the user's reference and convenience.

The RF module 1635 is connected to the processor 1610 and transmits and/or receives an RF signal. The processor 1610 delivers instructional information to the RF module 1635 in order to initiate communication, for example, transmit radio signals configuring voice communication data. The RF module 1635 includes a receiver and a transmitter to receive and transmit radio signals. An antenna 1640 functions to transmit and receive radio signals. Upon receiving the radio signals, the RF module 1635 may transfer signals for processing by the processor 1610 and convert the signal into a baseband. The processed signal may be converted into audible or readable information output via the speaker 1645.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A/5G (NextGen) system is primarily described, but can be applied to various wireless communication systems in addition to the 3GPP LTE/LTE-A/5G (NextGen) system.

What is claimed is:

1. A method for configuring, by a network node, a resource of a user equipment (UE) in a wireless communication system, the method comprising:
   receiving resource preference information of the UE;
   configuring a resource for the UE based on the resource preference information; and
   transmitting, to the UE, a result of configuring the resource for the UE,
   wherein the configuring of the resource for the UE based on the resource preference information comprises,
   based on a plurality of resource operation units in which an entire available resource range is divided into a predetermined number being configured for the UE, selecting a specific resource operation unit among the plurality of resource operation units according to the resource preference information of the UE,
   wherein the resource preference information:
   is network assistance information for indicating a resource operation scheme preferred by the UE; and
   indicates a performance centric representing a preference for a resource operation that prioritizes a performance of the UE, or an energy centric representing a preference for a resource operation that prioritizes resource saving of the UE,
   wherein the network node corresponds to a mobility management (MM) for managing a mobility of the UE, a session management (SM) for managing a session of the UE, or an access node (AN) for serving the UE, and
   wherein the configuring of the resource for the UE based on the resource preference information further comprises:
   based on the resource preference information indicating the performance centric, selecting an always-on protocol data unit (PDU) session scheme that maintains the session for the UE regardless of whether the session is used by the UE; and
   based on the resource preference information indicating the energy centric, selecting an on-demand PDU session scheme that releases the session when the session is not used by the UE for a predetermined time.

2. The method of claim 1, wherein the resource preference information is transmitted as a non-access stratum (NAS) message.

3. The method of claim 1, further comprising, based on a configuration parameter of the UE or other network node having to be changed according to the result of configuring the resource for the UE, transmitting a message requesting an update of the configuration parameter to the UE or at least one other network node.

4. A network node for configuring a resource of a user equipment (UE) in a wireless communication system, the network node comprising:
   a communication module configured to transmit and receive a signal; and
   a processor configured to control the communication module,
   wherein the processor is configured to:
   receive resource preference information of the UE;
   configure a resource for the UE based on the resource preference information, and select a specific resource operation unit among a plurality of resource operation units according to the resource preference information of the UE based on the plurality of resource operation units in which an entire available resource range is divided into a predetermined number being configured for the UE; and
   transmit, to the UE, a result of configuring the resource for the UE,
   wherein the resource preference information:
   is network assistance information for indicating a resource operation scheme preferred by the UE; and
   indicates a performance centric representing a preference for a resource operation that prioritizes a performance of the UE, or an energy centric representing a preference for a resource operation that prioritizes resource saving of the UE, wherein the network node corresponds to a mobility management (MM) for managing a mobility of the UE, a session management (SM) for managing a session of the UE, or an access node (AN) for serving the UE, and wherein the network node is further configured to configure the resource for the UE based on the resource preference information by:

based on the resource preference information indicating the performance centric, selecting an always-on protocol data unit (PDU) session scheme that maintains the session for the UE regardless of whether the session is used by the UE, and based on the resource preference information indicating the energy centric, selecting an on-demand PDU session scheme that releases the session when the session is not used by the UE for a predetermined time.

5. The network node of claim 4, wherein the resource preference information is transmitted as a non-access stratum (NAS) message.

6. The network node of claim 4, wherein the processor is further configured to, based on a configuration parameter of the UE or other network node having to be changed according to the result of configuring the resource for the UE, transmit a message requesting an update of the configuration parameter to the UE or at least one other network node.

* * * * *